US011862105B2

(12) United States Patent
Jung et al.

(10) Patent No.: US 11,862,105 B2
(45) Date of Patent: Jan. 2, 2024

(54) DISPLAY DEVICE AND GLOBAL DIMMING CONTROL METHOD THEREOF

(71) Applicant: LG Display Co., Ltd., Seoul (KR)

(72) Inventors: Jin Woo Jung, Paju-si (KR); Sang Jin Nam, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/959,695

(22) Filed: Oct. 4, 2022

(65) Prior Publication Data

US 2023/0178028 A1 Jun. 8, 2023

(30) Foreign Application Priority Data

Dec. 8, 2021 (KR) ........................ 10-2021-0174334

(51) Int. Cl.
*G09G 3/3266* (2016.01)
*G09G 3/3233* (2016.01)
*G09G 3/3275* (2016.01)

(52) U.S. Cl.
CPC ......... *G09G 3/3266* (2013.01); *G09G 3/3233* (2013.01); *G09G 3/3275* (2013.01);
(Continued)

(58) Field of Classification Search
CPC .. G09G 3/3266; G09G 3/3233; G09G 3/3275; G09G 3/3225; G09G 5/10; G09G 2300/0426; G09G 2300/0819; G09G 2300/0842; G09G 2300/0861; G09G 2300/0866; G09G 2310/02;
(Continued)

(56) References Cited

U.S. PATENT DOCUMENTS 10,679,562 B2 6/2020 Oh
10,867,559 B2 12/2020 Park et al.
(Continued)

FOREIGN PATENT DOCUMENTS

EP 3540720 A2 9/2019
KR 10-2018-0065495 A 6/2018
KR 10-2019-0060467 A 6/2019

OTHER PUBLICATIONS

European Patent Office, Extended European Search Report and Opinion, EP Patent Application No. 22207964.2, dated Feb. 21, 2023, 14 pages.

*Primary Examiner* — David Tung
(74) *Attorney, Agent, or Firm* — Fenwick & West LLP

(57) ABSTRACT

A display device comprises: a display panel including a first display area comprising a first pixels, and a second display area comprising a second pixels, each pixel including a light emitting element; a data driver circuit configured to output data voltages of an image to the first and second pixels; a gate driver configured to output scan signals to the first and second pixels; and a power supply configured to generate a low-potential power supply voltage that is applied to the light emitting element included in each pixel, the low-potential power supply voltage switching between a first level such that the light emitting element is capable of emitting light, and a second level such that the light emitting element cannot emit light, wherein a frame period of the display device includes an addressing period during which the low-potential power supply voltage switches from the second level to the first level.

16 Claims, 20 Drawing Sheets

(52) U.S. Cl.
CPC ............... *G09G 2300/0426* (2013.01); *G09G 2300/0819* (2013.01); *G09G 2300/0842* (2013.01); *G09G 2310/02* (2013.01); *G09G 2310/08* (2013.01); *G09G 2320/0626* (2013.01); *G09G 2330/021* (2013.01)

(58) Field of Classification Search
CPC ........... G09G 2310/08; G09G 2310/06; G09G 2310/061; G09G 2310/067; G09G 2310/0202; G09G 2310/063; G09G 2320/0626; G09G 2320/062; G09G 2320/064; G09G 2330/021; G09G 2330/00; G09G 2360/144
See application file for complete search history.

(56) References Cited

U.S. PATENT DOCUMENTS

| | | | | |
|---|---|---|---|---|
| 11,200,849 | B2 | 12/2021 | Park et al. | |
| 2016/0014402 | A1* | 1/2016 | Lee ...................... | H04N 13/398 348/51 |
| 2016/0140894 | A1* | 5/2016 | Eun ...................... | H04N 13/356 345/212 |
| 2016/0182901 | A1* | 6/2016 | Lee ...................... | H04N 13/341 345/691 |
| 2019/0164492 | A1 | 5/2019 | Oh | |
| 2019/0287464 | A1 | 9/2019 | Park et al. | |
| 2020/0066207 | A1* | 2/2020 | Gu ...................... | G09G 3/3275 |
| 2020/0090590 | A1* | 3/2020 | Kim ..................... | G09G 3/3233 |
| 2021/0090505 | A1 | 3/2021 | Park et al. | |

* cited by examiner

DISPLAY DEVICE AND GLOBAL DIMMING CONTROL METHOD THEREOF

CROSS-REFERENCE TO RELATED APPLICATION

This application claims priority to and the benefit of Republic of Korea Patent Application No. 10-2021-0174334, filed on Dec. 8, 2021, the disclosure of which is hereby incorporated by reference in its entirety.

BACKGROUND

1. Field

The present disclosure relates to a display device and a method for controlling global dimming of the display device.

2. Discussion of Related Art

Electroluminescent display devices are classified into inorganic light emitting display devices and organic light emitting display devices depending on the material of the emission layer. The organic light emitting display device of an active matrix type includes an organic light emitting diode (hereinafter, referred to as "OLED") that emits light by itself (e.g., self-emissive), and has an advantage in that the response speed is fast and the luminous efficiency, luminance, and viewing angle are large. In the organic light emitting display device, the OLED is formed in each pixel. The organic light emitting display device not only has a fast response speed, excellent luminous efficiency, luminance, and viewing angle, but also has excellent contrast ratio and color reproducibility since it can express black gray scales in complete black.

A pixel circuit of an organic light-emitting display device includes a light emitting element, a driving element for driving the light emitting element, and one or more switch elements. The pixel circuit may further include an EM switch element that is turned on/off according to a light emission control pulse. The EM switch element may adjust light-on and light-off durations of the OLED by switching a current path between the driving element and the OLED. In the organic light-emitting display device, a global dimming control method may control the luminance of an entire screen by controlling EM switch elements for all pixels by pulse width modulation (PWM) during a vertical blank period in which pixel data of an input image is not inputted. However, since the global dimming control method can control a duty ratio of an EM switch element within a vertical blank period which is very short, a range capable of adjusting the duty ratio is limited and thus the luminance of the screen cannot be varied linearly over a wide range.

Since the EM switch element suffers from stresses due to a driving period that is longer than other switch elements in the pixel circuit, the EM switch element deteriorates faster than the other switch elements in the pixel circuit. When the EM switch element is implemented by an oxide transistor, the reliability of the EM switch element is reduced.

SUMMARY

The present disclosure has been made in an effort to address aforementioned necessities and/or drawbacks.

The present disclosure provides a display device and a method for controlling a global dimming of the display device that is capable expanding a duty ratio adjustment range for performing global dimming and adjusting the luminance of a screen without an EM switch element.

In one embodiment, a display device comprises: a display panel including a first display area comprising a first plurality of pixels, and a second display area comprising a second plurality of pixels, each pixel from the first plurality of pixels and the second plurality of pixels including a corresponding light emitting element; a data driver circuit configured to output a plurality of data voltages of an image to the first plurality of pixels and the second plurality of pixels; a gate driver configured to output a plurality of scan signals to the first plurality of pixels and the second plurality of pixels; and a power supply configured to generate a low-potential power supply voltage that is applied to a corresponding light emitting element included in each pixel from the first plurality of pixels and the second plurality of pixels, the low-potential power supply voltage switching between a first level such that the light emitting element in each respective pixel is capable of emitting light, and a second level such that the light emitting element in each respective pixel cannot emit light, wherein a frame period of the display device includes an addressing period during which the plurality of data voltages of the image and the plurality of scan signals are output to the first plurality of pixels and the second plurality of pixels, and a blank period during which the plurality of data voltages and the plurality of scan signals are not output to the first plurality of pixels and the second plurality of pixels, wherein during a first portion of the addressing period the low-potential power supply voltage is at the second level such that none of the first plurality of pixels in the first display area emit light and none of the second plurality of pixels in the second display area emit light, and during a second portion of the addressing period that is subsequent the first portion, the low-potential power supply voltage is at the first level such that the first plurality of pixels in the first display area emit light to display a first part of the image and at least a portion of the second plurality of pixels in the second display area emit light to display at least a portion of a second part of the image.

In one embodiment, a display device comprises: a display panel including a first display area comprising a first plurality of pixels, and a second display area comprising a second plurality of pixels, each pixel from the first plurality of pixels and the second plurality of pixels including a corresponding light emitting element; a data driver circuit configured to output a plurality of data voltages of an image to the first plurality of pixels and the second plurality of pixels; a gate driver configured to output a plurality of scan signals to the first plurality of pixels and the second plurality of pixels; and a power supply configured to generate a low-potential power supply voltage that is applied to a corresponding light emitting element included in each pixel from the first plurality of pixels and the second plurality of pixels, the low-potential power supply voltage switching between a first level such that the light emitting element in each respective pixel is capable of emitting light, and a second level that is greater than the first level such that the light emitting element in each respective pixel cannot emit light, wherein a frame period of the display device includes an addressing period during which the plurality of data voltages of the image and the plurality of scan signals are output to the first plurality of pixels and the second plurality of pixels, and during the addressing period the low-potential power supply voltage switches from the second level to the first level such that the light emitting element in each respective pixel can emit light to display the image.

In one embodiment, a display device comprises: a display panel including a first display area comprising a first plurality of pixels, and a second display area comprising a second plurality of pixels, each pixel from the first plurality of pixels and the second plurality of pixels including a corresponding light emitting element; a data driver circuit configured to output a plurality of data voltages of an image to the first plurality of pixels and the second plurality of pixels; a gate driver configured to output a plurality of scan signals to the first plurality of pixels and the second plurality of pixels; and a power supply configured to generate a low-potential power supply voltage that is applied to a corresponding light emitting element included in each pixel from the first plurality of pixels and the second plurality of pixels, the low-potential power supply voltage switching between a first level such that the light emitting element in each respective pixel is capable of emitting light, and a second level that is greater than the first level such that the light emitting element in each respective pixel cannot emit light, wherein a frame period of the display device includes an addressing period during which the plurality of data voltages of the image and the plurality of scan signals are output to the first plurality of pixels and the second plurality of pixels, and during the addressing period the low-potential power supply voltage switches from the second level to the first level, wherein the display device is configured to operate in one of a plurality of modes where each mode has a corresponding a duty ratio of the first level of the low-potential power supply voltage and the second level of the low-potential power supply voltage from a plurality of different duty ratios, wherein the display device is configured to operate in one of a plurality of modes where each mode has a corresponding a duty ratio of the first level of the low-potential power supply voltage and the second level of the low-potential power supply voltage from a plurality of different duty ratios.

The problems to be solved by the present disclosure are not limited to those mentioned above, and other problems not mentioned will be clearly understood by those skilled in the art from the following description.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
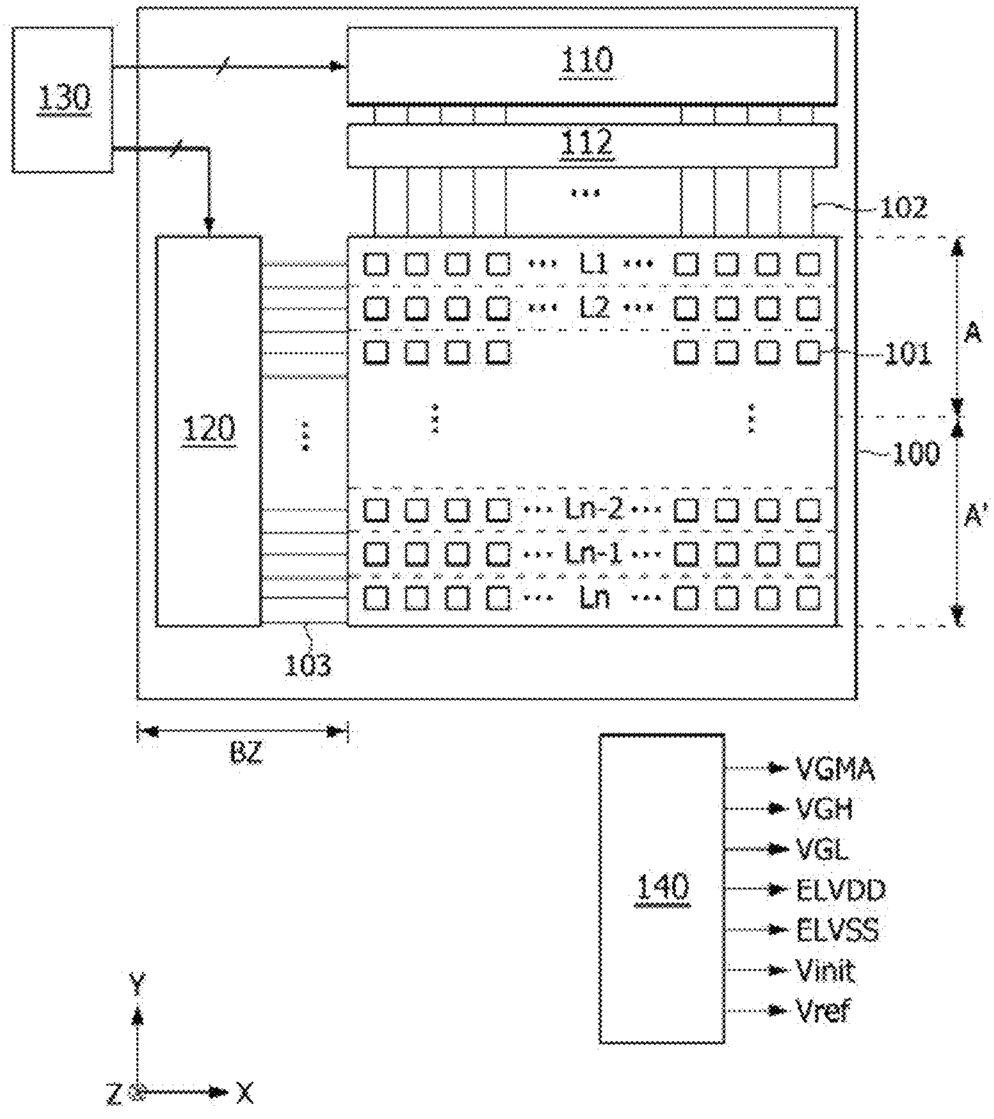
FIG. 1 is a block diagram illustrating a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “comprising” used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Each of the pixels may include a plurality of sub-pixels having different colors in order to reproduce the color of the image on a screen of the display panel. Each of the sub-pixels includes a transistor used as a switch element or a driving element. Such a transistor may be implemented as a thin film transistor (TFT).

A driving circuit of the display device writes pixel data of an input image to pixels on the display panel. To this end, the driving circuit of the display device may include a data driving circuit configured to supply data signal to the data lines, a gate driving circuit configured to supply a gate signal to the gate lines, and the like.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. In embodiments, descriptions will be given based on an example in which the transistors of the pixel circuit and the gate driving circuit are implemented as the n-channel oxide TFTs, but the present disclosure is not limited thereto.

Generally, a transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of an n-channel transistor, a gate-on voltage may be a gate high voltage, and a gate-off voltage may be a gate low voltage.

Hereinafter, various embodiments of the present disclosure will be described in detail with reference to the accompanying drawings. In the following embodiments, a display device will be described focusing on an organic light emitting display device, but the present disclosure is not limited thereto.

Hereinafter, various embodiments of the present disclosure will be described in detail with reference to the accompanying drawings. In the following embodiments, a display device will be described focusing on an organic light emitting display device, but the present disclosure is not limited thereto. Also, the scope of this disclosure is not intended to be limited by the names of components or signals in the following embodiments and claims.

Figure 2:
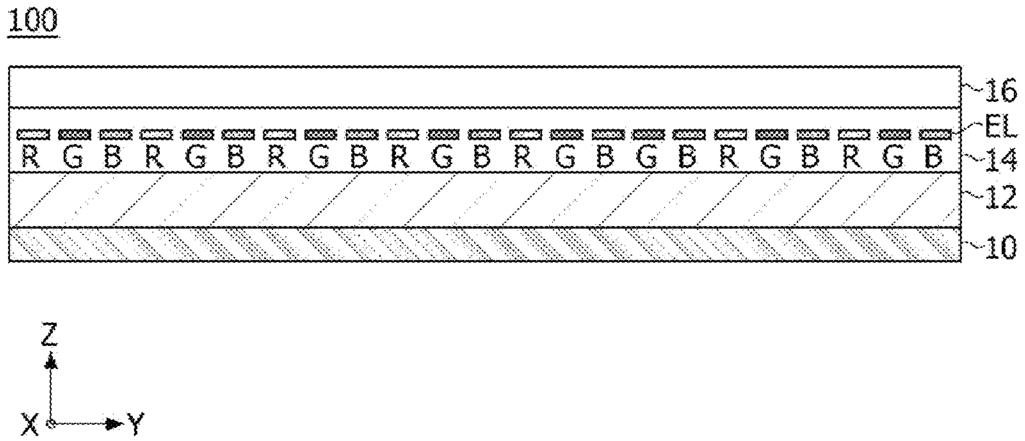
FIG. 2 is a cross-sectional view illustrating a cross-sectional structure of the display panel shown in FIG. 1 according to an embodiment of the present disclosure.

Referring to FIGS. 1 and 2, a display device according to an embodiment of the present disclosure includes a display panel 100 and a display panel driver for writing pixel data to pixels of the display panel 100.

The display panel 100 may be a panel having a rectangular structure with a length in the X-axis direction, a width in the Y-axis direction, and a thickness in the Z-axis direction. The display panel 100 includes a pixel array that displays an input image on a screen. The pixel array may be divided into a plurality of pixel regions including a first pixel region A and a second pixel region A' in which an addressing period is separated based on an inversion timing of a low-potential power supply voltage ELVSS.

The pixel array includes a plurality of data lines 102, a plurality of gate lines 103 that intersect with the plurality of data lines 102, and pixels 101 arranged in a matrix form. The display panel 100 may further include power lines commonly connected to the pixels. The power lines supply to the pixels 101 a voltage required for driving the pixels 101. For example, the display panel 100 may include a VDD line to which a pixel driving voltage ELVDD is applied and a VSS line to which a low-potential power supply voltage ELVSS is applied. The power lines may further include a reference (REF) line through which a reference voltage Vref is applied and an initialization (INIT) line through which an initialization voltage Vinit is applied.

The cross-sectional structure of the display panel 100 may include a circuit layer 12, a light emitting element layer 14, and an encapsulation layer 16 stacked on a substrate 10 as shown in FIG. 2 according to one embodiment.

The circuit layer 12 may include a TFT array including a pixel circuit connected to wirings such as a data line, a gate line, and a power line, a de-multiplexer array 112, a gate driver 120, and the like. The wirings and circuit elements of the circuit layer 12 may include a plurality of insulating layers, two or more metal layers separated with the insulating layer therebetween, and an active layer having a semiconductor material. All transistors formed in the circuit layer 12 may be implemented as n-channel oxide TFTs, but the present disclosure is not limited thereto.

The light emitting element layer 14 may include a light emitting element EL driven by a pixel circuit. The light emitting element EL may include a red (R) light emitting element, a green (G) light emitting element, and a blue (B) light emitting element. In another embodiment, the light emitting element layer 14 may include a white light emitting element and a color filter. The light emitting elements EL of the light emitting element layer 14 may be covered by a multi-passivation layer including an organic film and an inorganic film.

The encapsulation layer 16 covers the light emitting element layer 14 to seal the circuit layer 12 and the light emitting element layer 14. The encapsulation layer 16 may have a multilayered insulating structure in which an organic film and an inorganic film are alternately stacked. The inorganic film blocks or at least reduces the penetration of moisture and oxygen. The organic film planarizes the surface of the inorganic film. When the organic film and the inorganic film are stacked in multiple layers, a movement path of moisture or oxygen becomes longer compared to a single layer, so that penetration of moisture and oxygen affecting the light emitting element layer 14 can be effectively blocked or at least reduced.

A touch sensor layer (not shown) may be formed on the encapsulation layer 16, and a polarizing plate or a color filter layer may be disposed thereon. The touch sensor layer may include capacitive touch sensors that sense a touch input based on a change in capacitance before and after the touch input. The touch sensor layer may include metal wiring patterns and insulating films forming the capacitance of the touch sensors. The insulating films may insulate a portion where the metal wiring patterns are intersected, and may planarize the surface of the touch sensor layer. The polarizing plate may improve visibility and contrast ratio by converting the polarization of external light reflected by metal in the touch sensor layer and the circuit layer. The polarizing plate may be implemented as a circular polarizing plate or a polarizing plate in which a linear polarizing plate and a phase retardation film are bonded. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The pixel array includes a plurality of pixel lines L1 to Ln. Each of the pixel lines L1 to Ln includes one line of pixels arranged along the line direction (X-axis direction) in the pixel array of the display panel 100. Pixels arranged in one pixel line share a same gate line 103. Sub-pixels arranged in the column direction Y along the data line direction share the same data line 102. One horizontal period is a time obtained by dividing one frame period by the total number of pixel lines L1 to Ln.

The display panel 100 may be implemented as a non-transmissive display panel or a transmissive display panel. The transmissive display panel may be applied to a transparent display device in which an image is displayed on a screen and an actual background is visible. The display panel 100 may be manufactured as a flexible display panel.

Each of the pixels 101 may be divided into a red sub-pixel, a green sub-pixel, and a blue sub-pixel for color implementation. Each of the pixels may further include a white sub-pixel. Each of the sub-pixels includes a pixel circuit. Hereinafter, a pixel may be interpreted as having the same meaning as a sub-pixel. Each of the pixel circuits is connected to data lines, gate lines, and power lines.

The pixels may be arranged as real color pixels and pentile pixels. A real color pixel includes a red sub-pixel, a green sub-pixel, and a blue sub-pixel. A pentile pixel may realize a higher resolution than the real color pixel by driving two sub-pixels having different colors as one pixel 101 through the use of a preset pixel rendering algorithm. The pixel rendering algorithm may compensate for insufficient color representation in each pixel with the color of light emitted from an adjacent pixel.

The display panel driver writes the pixel data of the input image to the pixels of the display panel 100 under the control of the timing controller 130. The display panel driver maintains the low-potential power supply voltage ELVSS as a light-off voltage during a first addressing period in which pixel data is sequentially written in pixels of the first pixel region A one pixel line at a time. The display panel driver maintains the low-potential power supply voltage ELVSS as a light-on voltage during a second addressing period in which pixel data is sequentially written in pixels of the second pixel region A' one pixel line at a time. The display panel driver inverts the low-potential power supply voltage ELVSS from the light-off voltage to the light-on voltage between the first addressing period and the second addressing period. The pixels may emit light when the low-potential power voltage ELVSS is the light-off voltage.

The display panel driver includes a data driver 110, a gate driver 120, a power supply 140, and a timing controller 130 according to one embodiment. The display panel driver may further include a de-multiplexer array 112 disposed between the data driver 110 and the data lines 102.

The power supply 140 generates direct current (DC) power required for driving the pixel array and the display panel driver of the display panel 100 by using a DC-DC converter. The DC-DC converter may include a charge pump, a regulator, a buck converter, a boost converter, and the like. The power supply 140 may adjust the level of a DC input voltage applied from a host system (not shown) and generate voltages such as a gamma reference voltage VGMA, a gate-on voltage, a gate-off voltage, the pixel driving voltage ELVDD, the low-potential power supply voltage ELVSS, an initialization voltage Vinit, and the reference voltage Vref. The gamma reference voltage VGMA is supplied to the data driver 110. The gate-on voltage and the gate-off voltage are supplied to the gate driver 120. The voltages such as the pixel driving voltage ELVDD, the low-potential power supply voltage ELVSS, the initialization voltage Vinit, and the reference voltage Vref are supplied to the pixels 101 through the power lines commonly connected to the pixels 101.

The power supply 140 may change output voltages under the control of the timing controller 130. For example, the power supply 140 may generate a preset light-on voltage during a light-off period for suppressing emission of pixels, and may generate a light-off voltage higher than the light-on voltage during a light-on period in which light emission of pixels is allowed.

The de-multiplexer array 112 sequentially supplies the data voltages outputted from channels of the data driver 110 to the data lines 102 using a plurality of de-multiplexers DEMUX. Each of the de-multiplexers may include a multiple of switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driver may further include a touch sensor driver for driving the touch sensors. The touch sensor driver is omitted from FIG. 1. The data driver 110 and the touch sensor driver may be integrated into one drive integrated circuit (IC). In mobile devices or wearable devices, the timing controller 130, the power supply 140, the data driver 110, and the like may be integrated into one drive IC.

The display panel driver may operate in a low-speed driving mode under the control of the timing controller 130. The low-speed driving mode may be set to reduce power consumption of the display device when an input image does not change during a preset number of frames as a result of analyzing the input image. In the low-speed driving mode, the power consumption of the display panel driver and the display panel 100 may be reduced by lowering a refresh rate (e.g., a frame frequency of the pixels), when a still image is inputted for a predetermined time or longer. The low-speed driving mode is not limited to a case where the still image is inputted. For example, when the display device operates in a standby mode or when a user command or an input image is not inputted to the display panel driver for a predetermined time or longer, the display panel driver may operate in the low-speed driving mode.

The data driver 110 receives pixel data of the input image received as a digital signal from the timing controller 130 and outputs a data voltage. The data driver 110 generates the data voltage Vdata by converting the pixel data of the input image into a gamma compensation voltage every frame period using a digital to analog converter (DAC). The gamma reference voltage VGMA is divided into gamma compensation voltages for each grayscale through a voltage divider circuit. The gamma compensation voltage for each grayscale is provided to the DAC in the data driver 110. The data voltage Vdata is outputted through an output buffer from each of the channels of the data driver 110.

The gate driver 120 may be implemented as a gate in panel (GIP) circuit formed in the circuit layer 12 on the display panel 100 together with the TFT array of the pixel array and wirings. The gate driver 120 may be disposed on a bezel BZ, which is non-display region of the display panel 100, or may be distributedly disposed in a pixel array in which an input image is reproduced. The gate driver 120 sequentially outputs gate signals to the gate lines 103 under the control of the timing controller 130. The gate driver 120 may sequentially supply the gate signals to the gate lines 103 by shifting the gate signals using a shift register. The gate signals may include various gate pulses, such as a scan pulse, an initialization pulse, a sensing pulse, and the like.

The timing controller 130 receives digital video data DATA of an input image, and a timing signal synchronized with the digital video data, from the host system. The timing signal may include a vertical synchronization signal Vsync, a horizontal synchronization signal Hsync, a clock CLK, and a data enable signal DE. Because a vertical period and a horizontal period may be known by counting the data enable signal DE, the vertical synchronization signal Vsync and the horizontal synchronization signal Hsync may be omitted. The data enable signal DE has a cycle of one horizontal period (1H).

The host system may be one of a television (TV) system, a tablet computer, a notebook computer, a navigation system, a personal computer (PC), a home theater system, a mobile device, a wearable device, and a vehicle system. The host system may scale the image signal from the video source to fit the resolution of the display panel 100, and may transmit it to the timing controller 130 together with the timing signal.

The host system may adjust the overall luminance of images reproduced on the display panel by determining the luminance of the surrounding environment based on an output signal of a luminance sensor. The host system may change a global dimming duty ratio according to a luminance value such as a display brightness value (DBV) or a peak luminance control (PLC), which is variable by a screen brightness designated by the user. The host system may classify a normal driving mode for the display device into an outdoor mode, a normal mode, a night mode, a power saving mode, and the like, and may change the global dimming duty ratio for each mode.

The host system or the timing controller 130 may vary the global dimming duty ratio based on the average picture level (APL) of the input image, or may vary the global dimming duty ratio between a still image and a moving image by detecting the movement of an object in the input image to determine whether there is a movement.

The timing controller 130 may multiply the input frame frequency by i (i is a natural number) in the normal driving mode, so that it can control the operation timing of the display panel driver at a frame frequency of the input frame frequency×i Hz. The input frame frequency is 60 Hz in a national television standards committee (NTSC) system and 50 Hz in a phase-alternating line (PAL) system. For example, the display panel driver may address pixel data to the pixels 101 with a frame frequency of 120 Hz or higher under the control of the timing controller 130. In order to lower the refresh rate of pixels in the low-speed driving mode, the timing controller 130 may lower the driving frequency for the display panel driver by lowering the frame frequency to a frequency between 1 Hz and 30 Hz.

The timing controller 130 generates a data timing control signal for controlling the operation timing of the data driver 110 based on the timing signals Vsync, Hsync, DE received from the host system, a control signal for controlling the operation timing of the de-multiplexer array 112, and a gate timing control signal for controlling the operation timing of the gate driver 120. The timing controller 130 synchronizes the data driver 110, the de-multiplexer array 112, the touch sensor driver, and the gate driver 120 by controlling the operation timing of the display panel driver.

The gate timing control signal generated from the timing controller 130 may be inputted to the shift registers of the gate driver 120 through a level shifter (not shown). The level shifter may receive the gate timing control signal, generate a start pulse and a shift clock, and provide them to the shift registers of the gate driver 120.

The timing controller 130 may vary the global dimming duty ratio for every frame by varying the duty ratio of the low-potential power voltage ELVSS commonly applied to the pixels 101. The timing controller 130 controls a duty ratio, which is a ratio between a duration of the light-on voltage and a duration of the light-off voltage in the low-potential power supply voltage ELVSS, according to the global dimming duty ratio. The duty ratio of the low-potential power supply voltage ELVSS is substantially the same as the global dimming duty ratio according to one embodiment.

When the duty ratio of the low-potential power supply voltage ELVSS is changed, the boundary position of the first pixel region A and the second pixel region A' is changed on the screen of the display panel 100. For example, when the duty ratio of the low-potential power supply voltage ELVSS is less than a predetermined threshold, the size of the second pixel region A' on the screen of the display panel 100 is reduced, so that the boundary between the first pixel region A and the second pixel region A' may go down on the screen (e.g., closer to the bottom of the screen). On the other hand, when the duty ratio of the low-potential power supply voltage ELVSS is greater than the predetermined threshold, the size of the second pixel region A' on the screen of the display panel 100 increases, so that the boundary between the first pixel region A and the second pixel region A' may go up on the screen (e.g., closer to the top of the screen).

Due to device characteristic deviations and process deviations caused in the manufacturing process of the display panel 100, there may be differences in electrical characteristics of the driving element among pixels, and such differences may increase as driving time of the pixels elapses. In order to compensate for variations in electrical characteristics of the driving elements between pixels, an internal compensation circuit may be embedded in the pixel circuit or an external compensation circuit may be connected to the pixel circuit. The internal compensation circuit samples electrical characteristics of the driving element for each sub-pixel by using the internal compensation circuit implemented in each pixel circuit and compensates the gate-source voltage Vgs of the driving element by the electrical characteristics. The external compensation circuit compensates for the change in the electrical characteristics of the driving element by generating a compensation value based on a result of sensing the electrical characteristics of the driving element using the external compensation circuit connected to the pixel circuit. The external compensation circuit includes a REF line (or a sensing line) connected to the pixel circuit, and an analog to digital converter (ADC) that converts the sensing voltage stored in the REF line into digital data. The sensing voltage may include electrical characteristics of the driving element DT, for example, a threshold voltage and/or mobility. An integrator may be connected to the input terminal of the ADC. The timing controller 130 to which the external compensation circuit is applied may generate a compensation value for compensating for a change in the electrical characteristics of the driving element DT according to the sensing data inputted from the ADC, and may compensate for the change in the electrical characteristics of the driving element DT by adding or multiplying the compensation value to the pixel data of the input image. The ADC may be embedded in the data driver 110.

The pixel circuit of the present disclosure may include the internal compensation circuit or may be connected to the external compensation circuit, without an EM switch element. The pixel circuit may include the internal compensation circuit and may be connected to the external compensation circuit, without an EM switch element.

Figure 3:
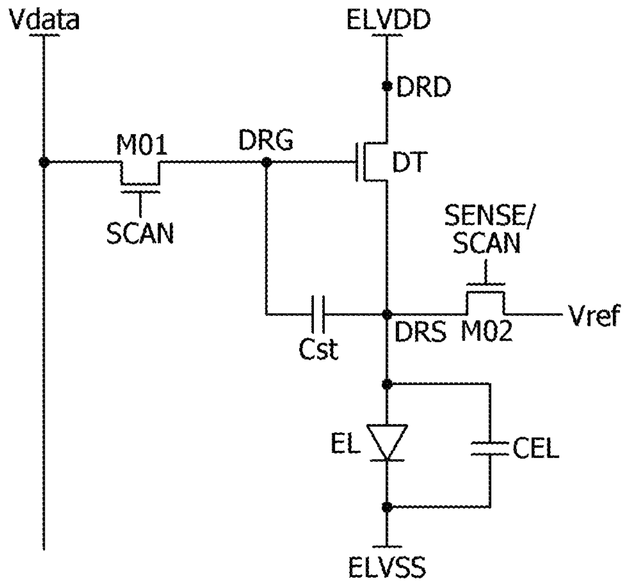
FIG. 3 is a circuit diagram illustrating a pixel circuit according to an embodiment of the present disclosure.

FIG. 3 is a circuit diagram illustrating a pixel circuit according to an embodiment of the present disclosure.

Referring to FIG. 3, the pixel circuit includes a light emitting element EL, a driving element DT for driving the light emitting element EL, a capacitor Cst connected between a second node DRG and a third node DRS, and a plurality of switch elements M01 and M02. In pixel circuit shown in FIG. 3, the driving element DT and the switch elements M01 and M02 may be implemented as n-channel oxide TFTs.

A voltage, such as the pixel driving voltage ELVDD, the low-potential power supply voltage ELVSS, the reference voltage Vref, or the like, is applied to this pixel circuit. The pixel driving voltage ELVDD is greater than the low-potential power supply voltage ELVSS. A gate-on voltage may be set to a voltage higher than the pixel driving voltage ELVDD. The reference voltage Vref may be set to a voltage that is less than the low-potential power supply voltage ELVSS. A gate-off voltage may be set to a voltage that is less than the reference voltage Vref.

The low-potential power supply voltage ELVSS may be generated at an alternating current (AC) voltage that swings between a light-on voltage and a light-off voltage. When the low-potential power supply voltage ELVSS rises to the light-off voltage, a voltage difference between an anode electrode and a cathode electrode of the light emitting element EL becomes less than a threshold voltage of the light emitting element EL, so that thus the light emitting element EL cannot emit light.

The gate driver 120 may include a first shift register that sequentially outputs a scan pulse SCAN. The gate driver 120 may further include a second shift register that sequentially outputs a sensing pulse SENSE.

The light emitting element EL may be implemented as an OLED including an anode electrode, a cathode electrode, and an organic compound layer connected between the anode electrode and the cathode electrode. The organic compound layer may include, but is not limited to, a hole injection layer (HIL), a hole transport layer (HTL), an emission layer (EML), an electron transport layer (ETL), and an electron injection layer (EIL). When a voltage is applied to the anode and cathode electrodes, holes passing through the hole transport layer HTL and electrons passing through the electron transport layer ETL move to the emission layer EML to form excitons. At this time, visible light may be emitted from the emission layer EML. The OLED used as the light emitting element EL may have a tandem structure in which a plurality of emitting layers are stacked. The OLED of the tandem structure can improve the luminance and lifespan of pixels.

The anode electrode of the light emitting element EL may be connected to the third node DRS, and the cathode electrode may be connected to the VSS line to which the low-potential power supply voltage ELVSS is applied. The light emitting element EL includes a capacitor CEL formed between the anode electrode and the cathode electrode.

The driving element DT generates an electric current for driving the light emitting element EL according to the gate-source voltage Vgs. The driving element DT includes a gate electrode connected to the second node DRG, a first electrode connected to the first node DRD to which the pixel driving voltage ELVDD is applied, and a second electrode connected to the third node DRS. The capacitor Cst is connected between the second node DRG and the third node DRS. The gate-source voltage Vgs of the driving element DT is charged in the capacitor Cst.

The first switch element M01 is turned on according to the gate-on voltage of the scan pulse SCAN to supply the data voltage Vdata to the second node DRG. The first switch element M01 includes a gate electrode connected to the first gate line to which the scan pulse SCAN is applied, a first electrode connected to the data line to which the data voltage Vdata is applied, and a second electrode connected to the second node DRG.

The second switch element M02 is turned on according to the gate-on voltage of the scan pulse SCAN or the sensing pulse SENSE to apply the reference voltage Vref to the third node DRS. The second switch element M02 includes a gate electrode connected to a second gate line to which the scan pulse SCAN or the sensing pulse SENSE is applied, a first electrode connected to the third node DRS, and a second electrode connected to the REF line to which the reference voltage Vref is applied.

The REF line may be connected to the external compensation circuit. In this case, the voltage of the third node DRS is stored in the capacitor on the REF line, the electrical characteristics of the driving element DT are stored in the REF line, and the voltage of the REF line is converted into digital data through an ADC. The electrical characteristics of the driving element DT may include a threshold voltage and mobility.

Figure 4:
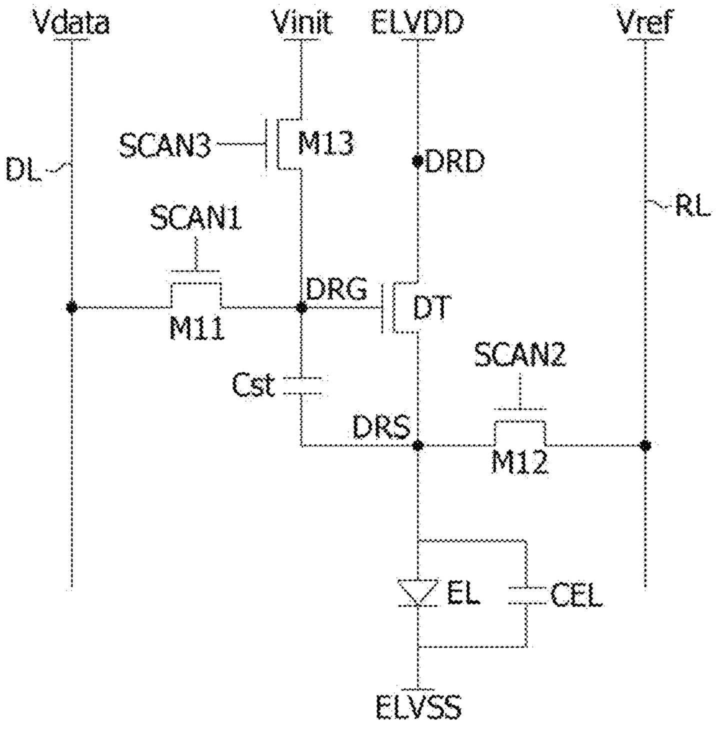
FIG. 4 is a circuit diagram illustrating a pixel circuit according to another embodiment of the present disclosure.

FIG. 4 is a circuit diagram illustrating a pixel circuit according to another embodiment of the present disclosure.

Referring to FIG. 4, the pixel circuit includes a light emitting element EL, a driving element DT for supplying an electrical current to the light emitting element EL, a capacitor Cst connected between a second node DRG and a third node DRS, and a plurality of switch elements M11, M12, and M13. In this pixel circuit, the driving element DT and the switch elements M11, M12 and M13 may be implemented as n-channel oxide TFTs.

A voltage, such as the pixel driving voltage ELVDD, the low-potential power supply voltage ELVSS, the reference voltage Vref, then initialization voltage Vinit, or the like, is applied to this pixel circuit. The pixel driving voltage ELVDD is greater than the low-potential power supply voltage ELVSS. A gate-on voltage may be set to a voltage greater than the pixel driving voltage ELVDD. A gate-off voltage may be set to a voltage less than the low-potential power supply voltage ELVSS. The reference voltage Vref may be set to a voltage less than the low-potential power supply voltage ELVSS and higher than the gate-off voltage. The initialization voltage Vinit is set to a voltage, at which the driving element DT is turned on, which is less than the pixel driving voltage ELVDD and equal to or greater than a half-gray scale of the data voltage Vdata.

The low-potential power supply voltage ELVSS may be generated at an AC voltage that swings between a light-on voltage and a light-off voltage. When the low-potential power supply voltage ELVSS rises to the light-off voltage, a voltage difference between an anode electrode and a cathode electrode of the light emitting element EL becomes less than a threshold voltage of the light emitting element EL, so that thus the light emitting element EL cannot emit light.

The gate driver 120 may include a first shift register that sequentially outputs a first scan pulse SCAN1, a second shift register that sequentially outputs a second scan pulse SCAN2, and a third shift register that sequentially outputs a third scan pulse SCAN3.

The light emitting element EL may be implemented as an OLED including an anode electrode, a cathode electrode, and an organic compound layer connected between these electrodes. The anode electrode of the light emitting element EL may be connected to the third node DRS, and the cathode electrode thereof may be connected to the VSS line to which the low-potential power supply voltage ELVSS is applied. The light emitting element EL includes a capacitor CEL formed between the anode electrode and the cathode electrode.

The driving element DT generates an electric current for driving the light emitting element EL according to the gate-source voltage Vgs. The driving element DT includes a gate electrode connected to the second node DRG, a first electrode connected to the first node DRD to which the pixel driving voltage ELVDD is applied, and a second electrode connected to the third node DRS. The capacitor Cst is connected between the second node DRG and the third node DRS.

A first switch element M11 is turned on according to a gate-on voltage of the scan pulse SCAN1 to supply the data voltage Vdata to the second node DRG. The first switch element M11 includes a gate electrode connected to a first gate line to which the first scan pulse SCAN1 is applied, a first electrode connected to a data line DL to which the data voltage Vdata is applied, and a second electrode connected to the second node DRG.

A second switch element M12 is turned on according to a gate-on voltage of the second scan pulse SCAN2 to supply the reference voltage Vref to the third node DRS. The second switch element M12 includes a gate electrode connected to a second gate line to which the second scan pulse SCAN2 is applied, a first electrode connected to the third node DRS, and a second electrode connected to a REF line RL to which the reference voltage Vref is applied.

A third switch element M13 is turned on according to a gate-on voltage of the scan pulse SCAN3 to supply the initialization voltage Vinit to the second node DRG. The third switch element M13 includes a gate electrode connected to a third gate line to which the third scan pulse SCAN3 is applied, a first electrode connected to an INIT line to which the initialization voltage Vinit is applied, and a second electrode connected to the second node DRG.

Figure 5:
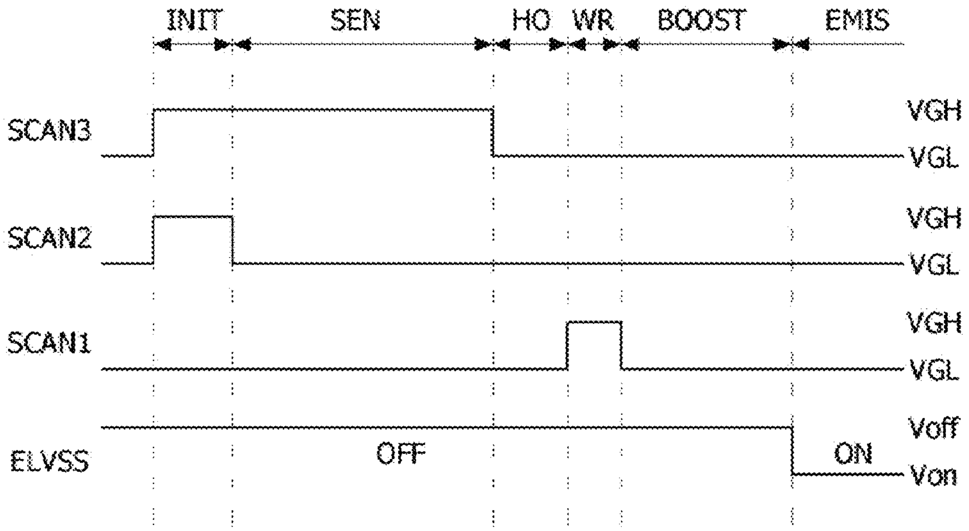
FIG. 5 is a waveform diagram illustrating a gate signal applied to the pixel circuit shown in FIG. 4 according to an embodiment of the present disclosure.

A gate signal as shown in FIG. 5 may be inputted to the pixel circuit shown in FIG. 4.

Referring to FIG. 5, the driving period of the pixel circuit may be divided into an initialization step INIT, a sensing step SEN, an addressing step WR, a boosting step BOOST, and a light emission step EMIS. In the initialization step INIT, the driving element DT is turned on. In the sensing step SEN, when the voltage of the third node DRS rises and the gate-source voltage Vgs of the driving element DT becomes less than the threshold voltage Vth of the driving element DT, the driving element DT is turned off. When the driving element DT is turned off in the sensing step SEN, the threshold voltage Vth of the driving element DT is sampled and stored in the capacitor Cst. In the hold period HO between the sensing step SEN and the addressing step WR, all of the gate signals SCAN1, SCAN2, and SCAN3 are at the gate-off voltage VGL. In the hold period HO, the second and third nodes DRG and DRS are floated to maintain their previous voltages.

When the data voltage Vdata is applied to the second node DRG in the addressing step WR, the data voltage Vdata compensated by the threshold voltage Vth is applied to the gate electrode of the driving element DT. After the capacitor CEL of the light emitting element EL is charged as the voltages of the second node DRG and the third node DRS floated in the boosting step BOOST are increased, the light emitting element EL may emit light by means of a current generated according to the gate-source voltage Vgs compensated by the threshold voltage Vth of the driving element DT in the light emission step EMIS. In the light emission step EMIS, the low-potential power supply voltage ELVSS is generated at the light-on voltage Von.

The third scan pulse SCAN3 is generated at a gate-on voltage VGH in the initialization step INIT and the sensing step SENSE. The third scan pulse SCAN3 is at the gate-off voltage VGL in the hold period HO, the addressing step WR, the boosting step BOOST, and the light emission step EMIS. The first scan pulse SCAN1 is synchronized with the data voltage Vdata of the pixel data, and is generated at the gate-on voltage VGH in the addressing step WR. The first scan pulse SCAN1 is at the gate-off voltage VGL in the hold period HO, the initialization step INIT, the sensing step SENSE, the boosting step BOOST, and the light emission step EMIS. The second scan pulse SCAN2 is generated at the gate-on voltage VGH in the initialization step INIT. The second scan pulse SCAN2 is at the gate-off voltage VGL in the sensing step SENSE, the hold period HO, the addressing step WR, the boosting step BOOST, and the light emission step EMIS.

Figure 6:
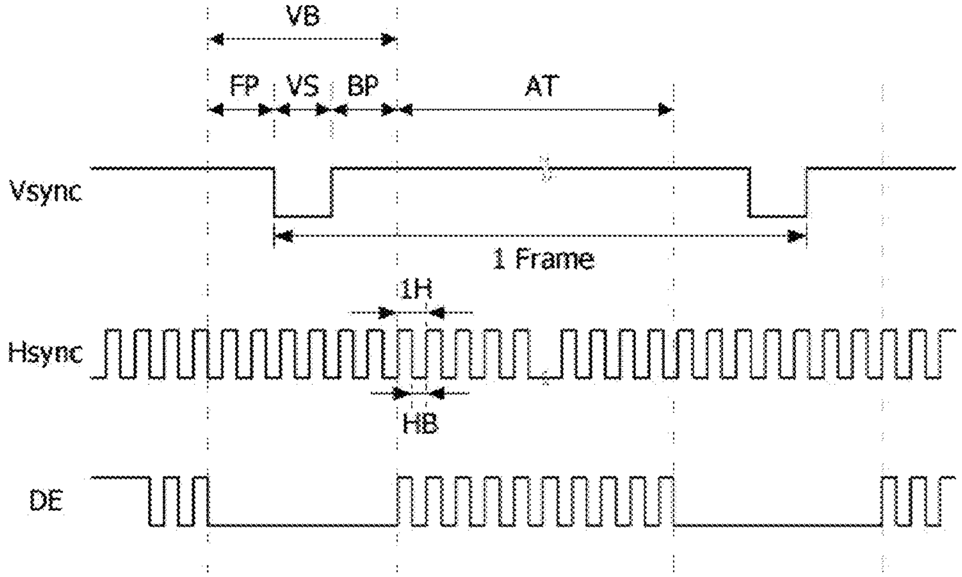
FIG. 6 is a diagram illustrating one frame period of a display device according to an embodiment of the present disclosure.

FIG. 6 is a diagram illustrating one frame period of a display device according to one embodiment.

Referring to FIG. 6, a frame period (one frame) is divided into an addressing period AT in which pixel data of an input image is written to pixels, and a vertical blank period VB in which no pixel data of an input image is written to pixels. In one embodiment, the vertical blank period VB includes a front porch FP portion, a vertical synch VS portion, and a back porch (BP) portion.

The vertical synchronization signal Vsync defines one frame period. One pulse cycle of a horizontal synchronization signal Hsync and a data enable signal DE is one horizontal period 1H. The display panel driver sequentially writes pixel data corresponding to one frame to the pixels of the display panel 100 one-pixel line at a time during the addressing period AT. The data voltage Vdata of the pixel data is simultaneously charged to the pixels in the one pixel line in synchronization with the scan pulse in the one horizontal period 1H.

Figure 7:
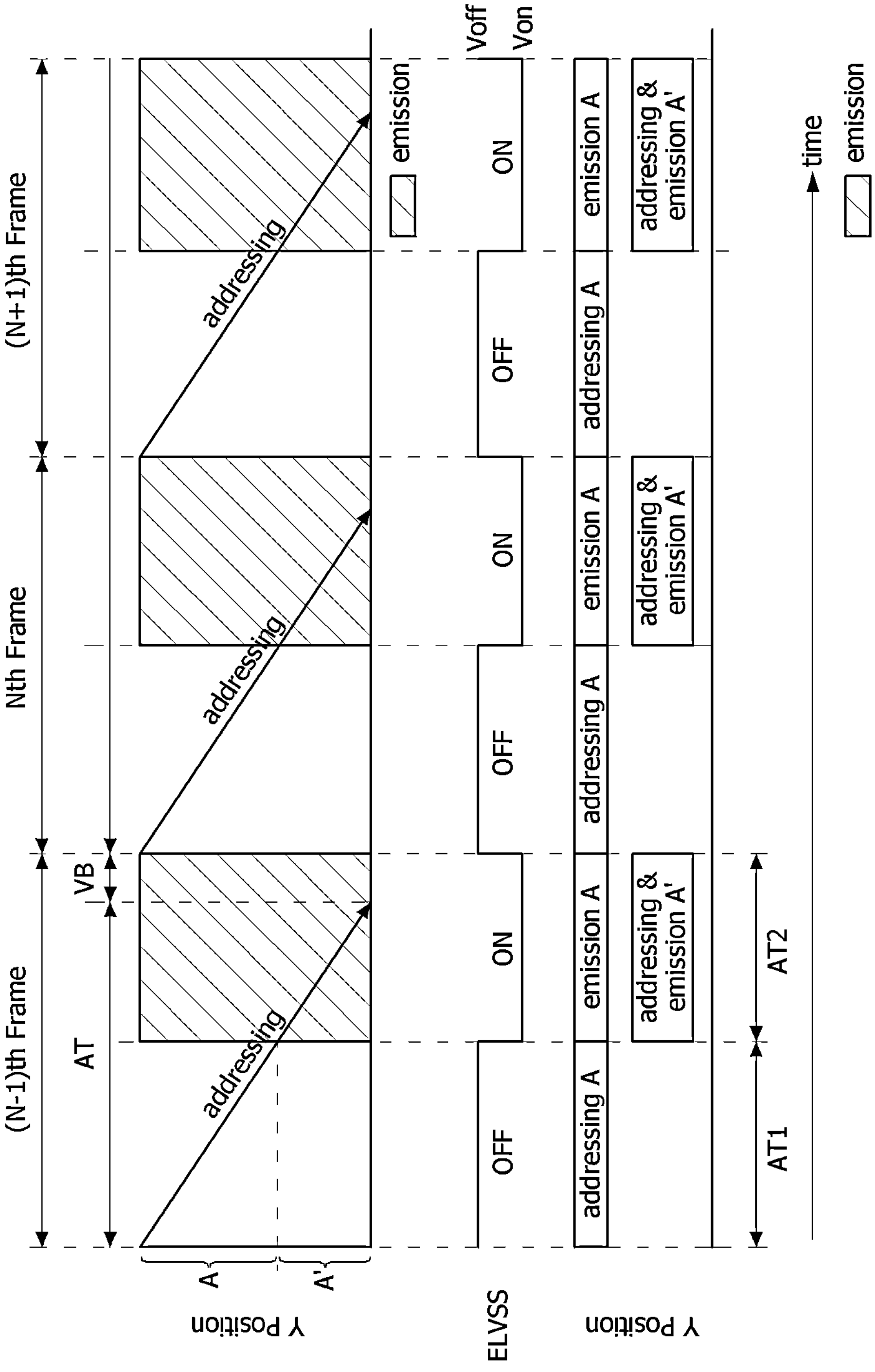
FIG. 7 is a diagram illustrating an addressing period, a light-on period, and a light-off period of a display device according to an embodiment of the present disclosure.

As shown in FIG. 7, an addressing period AT of the one frame period may include a first addressing period AT1 and a second addressing period AT2 divided with a time point therebetween at which the low-potential power supply voltage ELVSS is inverted. Thus, the first addressing period AT1 and the second addressing period AT2 are non-overlapping. The timing controller 130 may divide the addressing period AT of the one frame period into the first addressing period AT1 and the second addressing period AT2, transmit pixel data to be written to pixels in the first pixel region A to the data driver 110 in the first addressing period, and then transmit pixel data to be written to pixels in the second pixel region A' to the data driver 110 in the second addressing period AT2. The timing controller 130 may control the power supply 140 to temporarily stop the transmission of the pixel data during an addressing skip session set between the first addressing period AT1 and the second addressing period AT2 as will be further described below with respect to FIG. 9.

The data enable signal DE defines an effective data period including pixel data to be written to pixels within one horizontal period 1H. A pulse of the data enable signal DE is synchronized with the pixel data of the one pixel line.

During the vertical blank period VB, no new pixel data is written to the pixels. Sub-pixels maintain the voltages charged from a previous frame during the vertical blank period VB. The low-potential power supply voltage ELVSS may be maintained at the light-on voltage during at least a portion of the vertical blank period VB. Before the next frame period starts, the low-potential power supply voltage ELVSS may be inverted to the light-off voltage within the vertical blank period VB.

A horizontal blank period HB is a period during which there is no pixel data within one horizontal period. The horizontal blank period HB exists between one line data to be written to the sub-pixels in an ith (i being a positive integer) pixel line and one line data to be written to the sub-pixels in an (i+1)th pixel line.

In the display device of the present disclosure, as shown in FIGS. 1 and 7, the low-potential power supply voltage ELVSS is lowered to the light-on voltage Von within the addressing period AT in which pixel data is sequentially written one-pixel line at a time, so that the pixels starts to emit the light. Therefore, in the present disclosure, global dimming may be started within the addressing period AT and may be performed until the vertical blank period VB. As a result, the global dimming control method of the present disclosure may secure a global dimming period for a sufficiently long time for every frame period since the global dimming period occurs during the addressing period AT rather than the vertical blank period VB, thereby linearly controlling the global dimming duty ratio within a wide range. Accordingly, the luminance of the first and second pixel regions A and A' may not be linearly varied in a wide range of the duty ratio.

Referring to FIGS. 1 and 7, a screen of the display panel 100 may include a first pixel region A and a second pixel region A'. An addressing period of one frame period [(N−1)th to (N+1)th Frame]) may be divided into a first addressing period AT1 in which pixel data is sequentially written to pixels in the first pixel region A and a second addressing period AT2 in which pixel data is sequentially written to pixels in the second pixel region A'. In FIG. 7, '(N−1)th Frame' denotes an (N−1)th frame period, 'Nth Frame' denotes an Nth frame period, and '(N+1)th Frame' denotes an (N+1)th frame period.

During the first addressing period AT1 in which the pixels in the first pixel region A are scanned, the low-potential power supply voltage ELVSS is generated at the light-off voltage Voff, so that the pixels in the first pixel region A do not emit light. During the second addressing period AT2 in which the pixels in the second pixel region A' are scanned, the low-potential power supply voltage ELVSS is inverted to the light-on voltage Von. Therefore, the pixels in the first and second pixel regions A and A' start to emit light from the starting point of the second addressing period AT2 in which the second pixel region A' is scanned.

The first pixel region A may include two or more pixel lines from a first pixel line to an (I−1)th pixel line, where I is a positive integer equal to or greater than 2. The second pixel region A' may include two or more pixel lines from an I-th pixel line to an nth pixel line, where n is a positive integer greater than I by 2 or more. The low-potential power supply voltage ELVSS is supplied to all of the pixels in the first and second pixel regions A and A' through a VSS line formed as a common electrode in the screen of the display panel. Therefore, when the voltage levels of the low-potential power supply voltage ELVSS is changed, the voltage level of the low-potential power supply voltage ELVSS applied to all of the pixels is simultaneously changed.

During the first addressing period AT1, the data voltage Vdata of pixel data is sequentially charged one-pixel line at a time from the first pixel line to the (I−1)th pixel line included in the first pixel region A along the shift direction of the scan pulse. During the first addressing period AT1, the low-potential power supply voltage ELVSS maintains the light-off voltage Voff. For this reason, all of the pixels included in the first and second pixel regions A and A' do not emit light during the first addressing period ATE The second addressing period AT2 starts when pixel data starts to be written into the pixels in the I-th pixel line included in region A'. During the second addressing period AT2, the data voltage Vdata of pixel data is sequentially charged one-pixel line at a time from the I-th pixel line to the nth pixel line included in the second pixel region A' along the shift direction of the scan pulse. When the second addressing period AT2 starts, the low-potential power supply voltage ELVSS is inverted to the light-on voltage Von, and during the second addressing period AT2, the low-potential power supply voltage ELVSS is generated at the light-on voltage Von. As a result, since the low-potential power supply voltage ELVSS maintains the light-on voltage Von during the second addressing period AT2, the pixels included in the first and second pixel regions A and A' may emit light with a target luminance corresponding to the gray level of the pixel data during the second addressing period.

The low-potential power supply voltage ELVSS may be generated at a light-on voltage Von from the start of the second addressing period to the end of the vertical blank period VB. Accordingly, a maximum light-on duration of the pixels is a duration from the start of the second addressing period AT2 to the end of the vertical blank period VB. The timing controller 130 may vary the global dimming duty ratio according to the driving mode or the analysis result of an input image. As the global dimming duty ratio is high, a time point at which the low-potential power supply voltage ELVSS is inverted to the light-on voltage Von is advanced, so that a position of the Ith pixel line at which the second addressing period AT2 starts is changed to a position of a pixel line having an earlier scanning timepoint. On the contrary, as the global dimming duty ratio is low, a time point at which the low-potential power supply voltage ELVSS is inverted to the light-on voltage Von is delayed, so that a position of the Ith pixel line at which the second addressing period AT2 starts is changed to a position of a pixel line having a later scanning time point.

Figure 8:
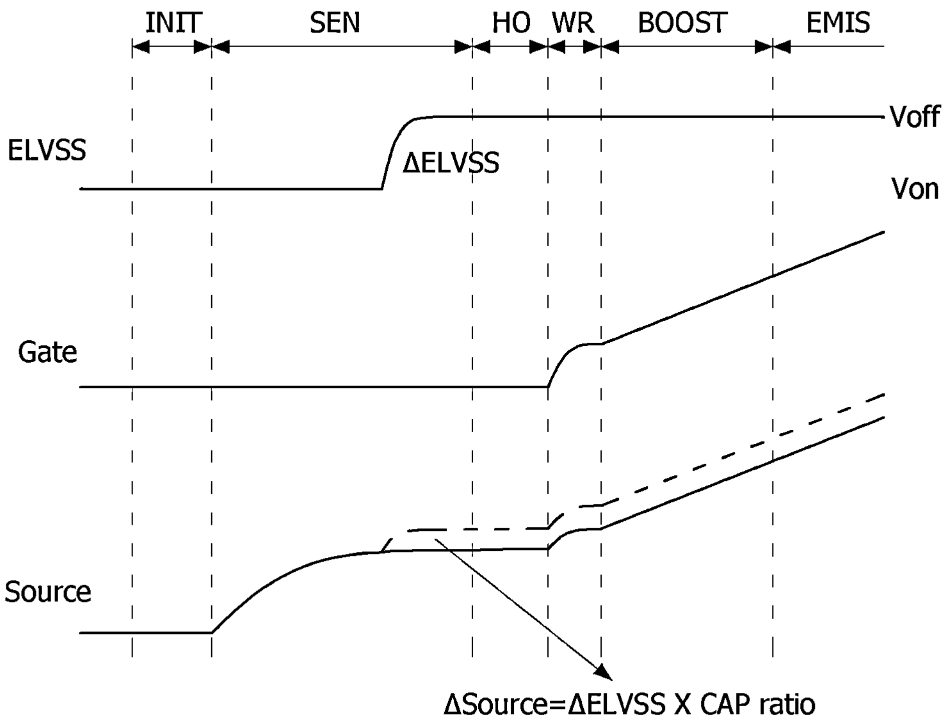
FIG. 8 is a waveform diagram illustrating an example in which a gate-source voltage of a driving element changes when a low-potential power supply voltage is changed according to an embodiment of the present disclosure.

Meanwhile, when the low-potential power supply voltage ELVSS is inverted, the gate-source voltage Vgs of the driving element DT may be changed, as illustrated in FIG. 8.

Referring to FIG. 8, when the low-potential power voltage ELVSS is changed within the addressing period AT, a voltage of the third node DRS coupled to the VSS line through the capacitor CEL, that is, a source voltage of the driving element DT, is changed to the low-potential power voltage ELVSS. At this time, the third node DRS is changed based on ΔELVSS*a CAP ratio. ΔELVSS is a variation amount of the low-potential power supply voltage ELVSS, and the CAP ratio is a ratio of the capacitors Cst and CEL which are connected to the third node DRS. In this case, the gate-source voltage Vgs of the driving element DT is changed in the pixel line in which the low-potential power voltage ELVSS is inverted and thus the luminance at the pixels in the corresponding pixel line is changed, so that a dim line may be visually recognized on the screen. In order to prevent or at least reduce this problem, the present disclosure may set an addressing skip session, as shown in FIGS. 9 and 10, in which addressing is temporarily stopped when the low-potential power voltage ELVSS is inverted.

The addressing skip session may be set between the first addressing period AT1 and the second addressing period AT2 within the addressing period AT of one frame period. During the addressing skip session set between the first addressing period AT1 and the second addressing period AT2, the low-potential power supply voltage ELVSS may be changed from the light-off voltage Voff to the light-on voltage Von. In addition, the addressing skip session may be set within the vertical blank period VB before entering the next frame period. During the addressing skip session set within the vertical blank period VB, the low-potential power supply voltage ELVSS may be changed from the light-on voltage Von to the light-off voltage Voff.

Figure 9:
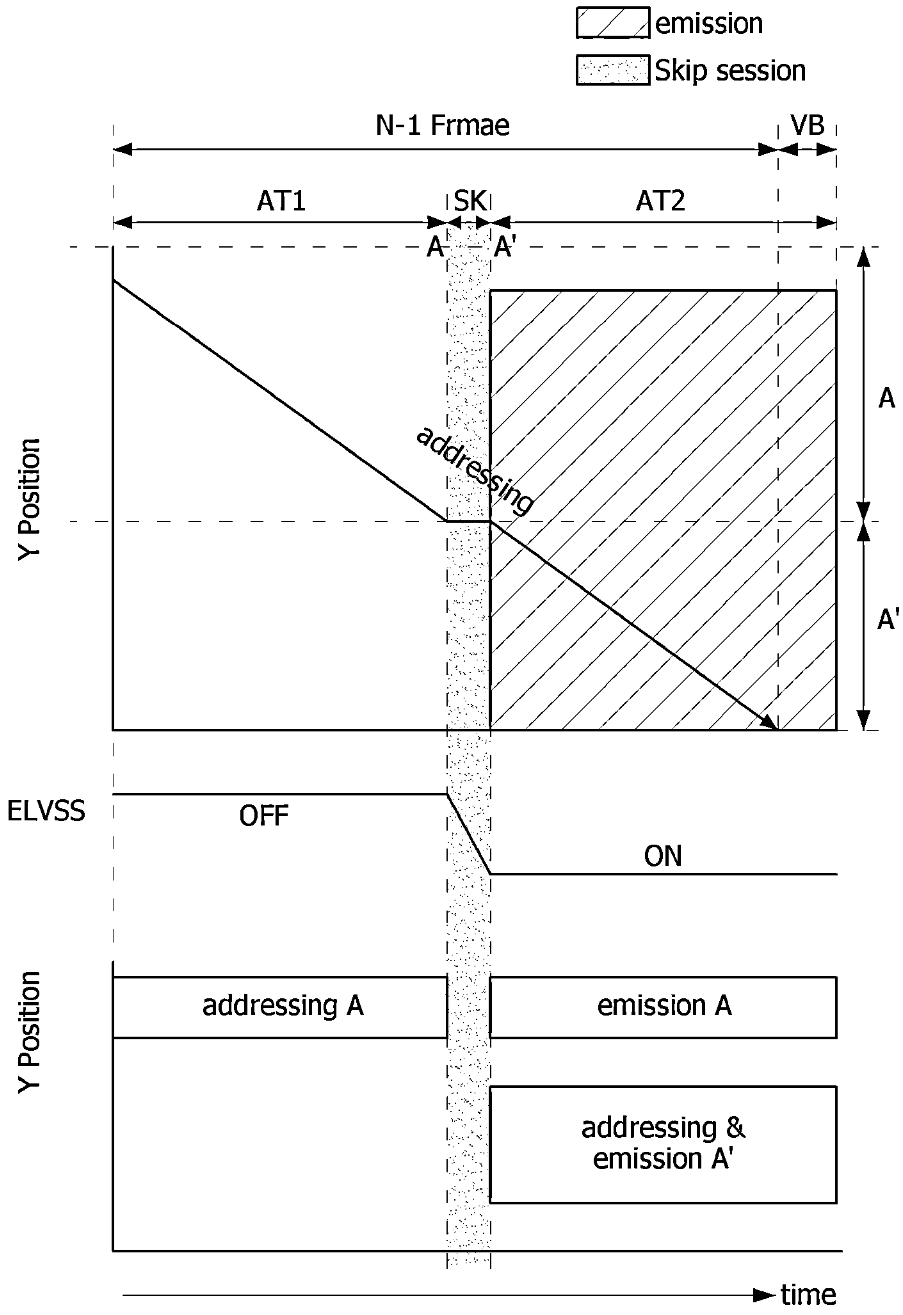
FIG. 9 is a diagram illustrating an example in which an addressing skip session is set between a first addressing period and a second addressing period according to an embodiment of the present disclosure.

FIG. 9 is a diagram illustrating an example in which an addressing skip session SK (e.g., an intermediate period) is set between a first addressing period AT1 and a second addressing period AT2 according to one embodiment. FIG. 10 is a waveform diagram illustrating an example in which a scan pulse is not generated in an addressing skip session SK according to one embodiment.

Figure 10:
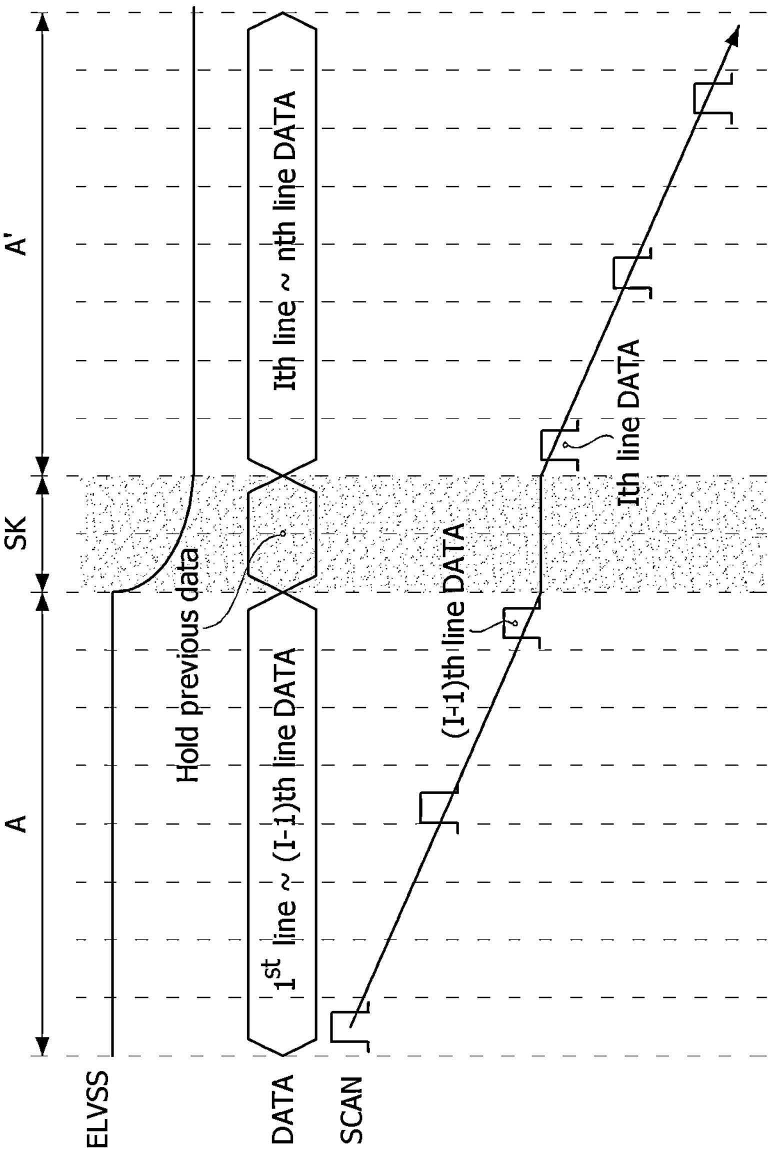
FIG. 10 is a waveform diagram illustrating an example in which no scan pulse is generated in an addressing skip session according to an embodiment of the present disclosure.

Referring to FIGS. 9 and 10, the gate driver 120 sequentially outputs gate signals to the first to (I−1)th pixel lines during the first addressing period AT1 under the control of the timing controller 130 and supplies the gate signals to the gate lines of the pixel lines. After that the first addressing period AT1, the gate driver 120 does not (e.g., refrains) output the gate signals, particularly, scan pulses, during the addressing skip session SK, and maintains the voltages of the gate lines at a gate-off voltage during the addressing skip session SK. As a result, during the addressing skip session SK, the data voltage Vdata of pixel data is not applied to the second nodes DRG of the pixel circuits since the scan pulses are not applied to all pixels in the Ith pixel line, as well as in the screen.

The timing controller 130 delays the pixel data of the input image during the addressing skip session SK using a line memory or a delay circuit, and then transmits the pixel data of the Ith pixel line to the data driver 110 when the second addressing period AT2 starts. The timing controller 130 may temporarily stop driving the output buffers between the output terminals of the data driver 110 and the data lines or turn off the output switch elements during the addressing skip session SK, so that the output terminals of the data driver 110 are separated from the data lines. In another embodiment, the timing controller 130 may turn off the switch elements of the de-multiplexer array 112 disposed between the output terminals of the data driver 110 and the data lines to electrically separate the output terminals of the data driver 110 from the data lines during the addressing skip session SK.

The gate driver 120 sequentially supplies the gate signals to the gate lines of the pixel lines from the Ith pixel line to the nth pixel line responsive to the second addressing period AT2 starting after the addressing skip session SK under the control of the timing controller 130.

Figure 11:
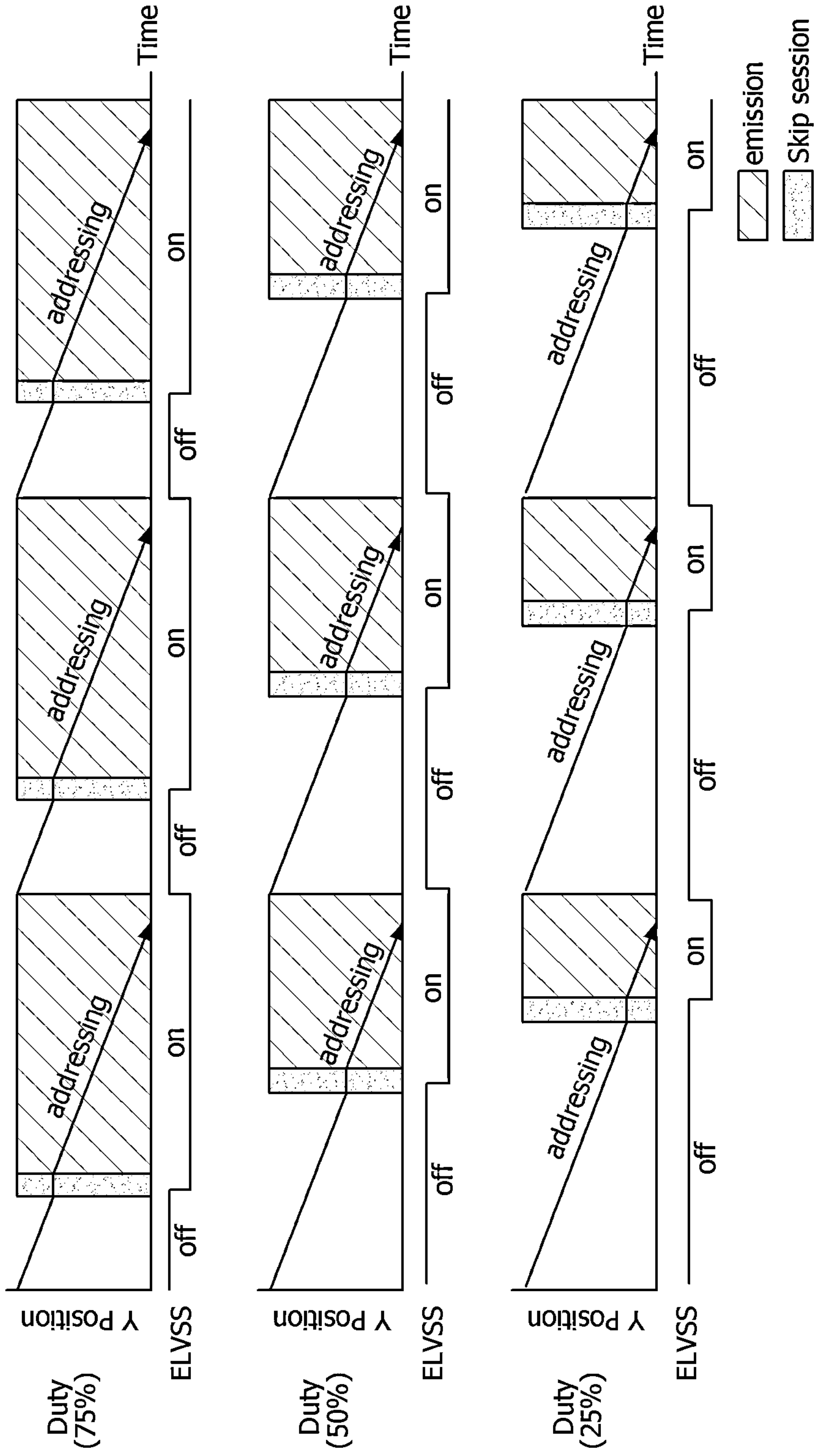
FIG. 11 is diagrams illustrating an example of global dimming according to an embodiment of the present disclosure.

FIG. 11 is diagrams illustrating an example of global dimming according to an embodiment of the present disclosure.

Referring to FIG. 11, the timing controller 130 may adjust the luminance of an image reproduced on the screen of the display panel by varying the global dimming duty ratio. That is, the global duty ratio is adjustable. For example, the timing controller 130 may adjust the luminance on the screen by varying the global dimming duty ratio to 25%, 50%, 75%, or the like. The position of the pixel line synchronized with the addressing skip session on the screen may vary according to the global dimming duty ratio.

Figure 12:
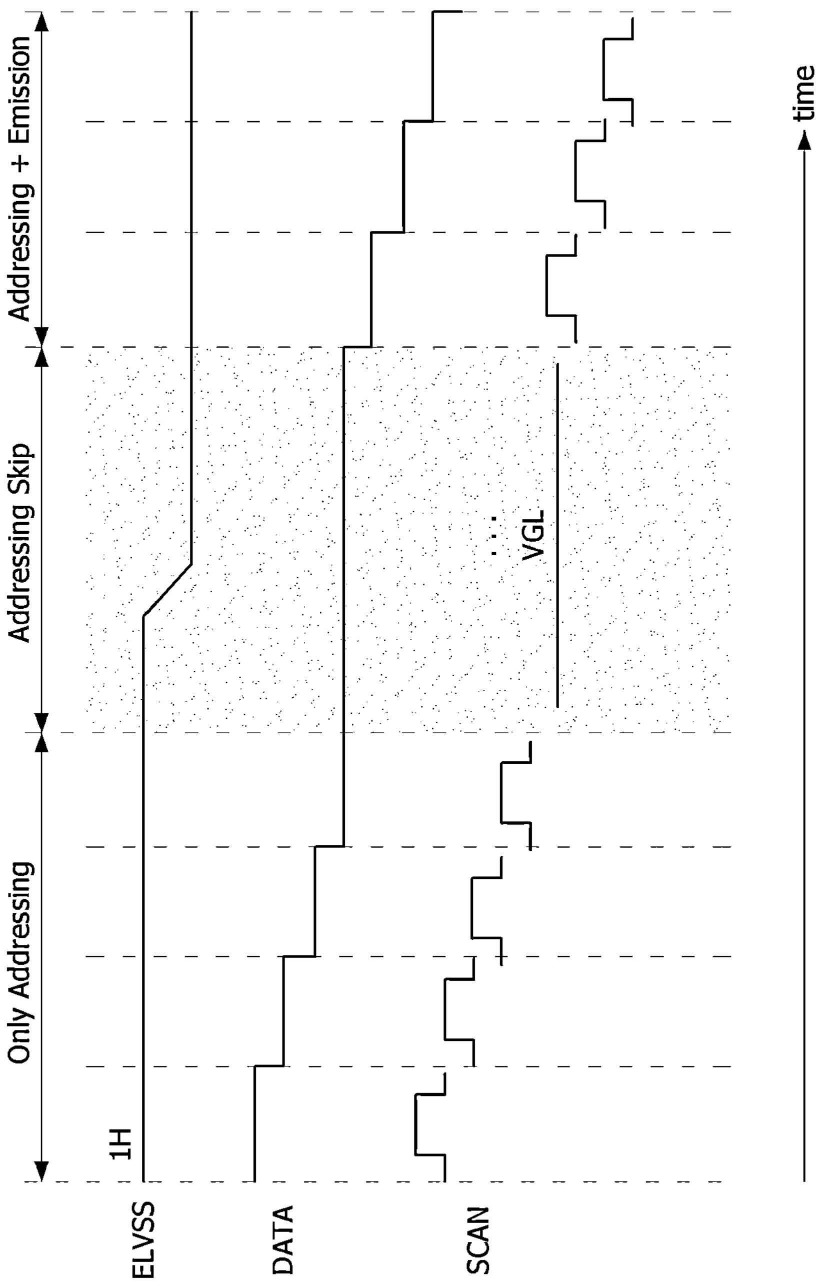
FIG. 12 is a waveform diagram illustrating an example in which a low-potential power supply voltage is changed and a data voltage is held during an addressing skip session according to an embodiment of the present disclosure.

FIG. 12 is a waveform diagram illustrating an example in which a low-potential power supply voltage is changed and a data voltage is held during an addressing skip session according to one embodiment.

Referring to FIG. 12, an input image may be a vertical gradation image in which a gray level value is gradually decreased from a first pixel line to an nth pixel line. In this case, the gray scale value of the data voltage Vdata of the pixel data is gradually decreased for each pixel line. The scan pulse SCAN may be sequentially applied to the pixel lines in synchronization with the data voltage Vdata during the first addressing period AT1 (e.g., "only addressing" in FIG. 12).

The low-potential power supply voltage ELVSS maintains the light-off voltage Voff during the first addressing period AT1. Accordingly, data addressing is performed during the first addressing period AT1 without emission, so that the pixels in the first pixel region A do not emit light and are charged with the data voltage Vdata.

During the addressing skip session SK (e.g., "addressing skip" in FIG. 12), the voltage of the data lines maintains a previous data voltage and the scan pulse maintains at the gate-off voltage VGL (Data Hold) so that data addressing is not performed. During the addressing skip session SK, the low-potential power supply voltage ELVSS is changed from the light-off voltage Voff to the light-on voltage Von.

The data voltage Vdata of the pixel data is generated at a gray scale voltage of the pixel data to be written to the pixels in the Ith pixel line when the second addressing period AT2 (e.g., "addressing+emission" in FIG. 12) starts after the addressing skip session SK. The scan pulse SCAN may be sequentially applied to the pixel lines in synchronization with the data voltage Vdata during the second addressing period AT2 starting after the addressing skip session SK. Accordingly, when the second addressing period AT2 starts, the data driver 110 resumes outputting the data voltage Vdata, and the gate driver 120 resumes outputting the scan pulse SCAN.

The low-potential power supply voltage ELVSS maintains the light-on voltage Von during the second addressing period AT2 and the vertical blank period VB. Accordingly, during the second addressing period AT2, data addressing is performed on the pixels in the second pixel region A', and at the same time, the pixels in the first and second pixel regions A and A' may emit light according to the global dimming duty ratio. In this case, the pixels in the first pixel region A emit light with a target luminance corresponding to the gray scale of pixel data written in a first addressing period of a current frame, and the pixels in the second pixel region A' emit light while performing data addressing that is updated from the pixel data written in a previous frame to pixel data of the current frame.

FIGS. 13A to 13E are views illustrating an example in which data addressing, addressing skip, and light emission are sequentially performed along a scanning direction of a display panel according to one embodiment. In FIGS. 13A to 13E, in an upper drawing which illustrates a screen of a display panel, a black screen represents that pixels that do not emit light.

Figure 13A:
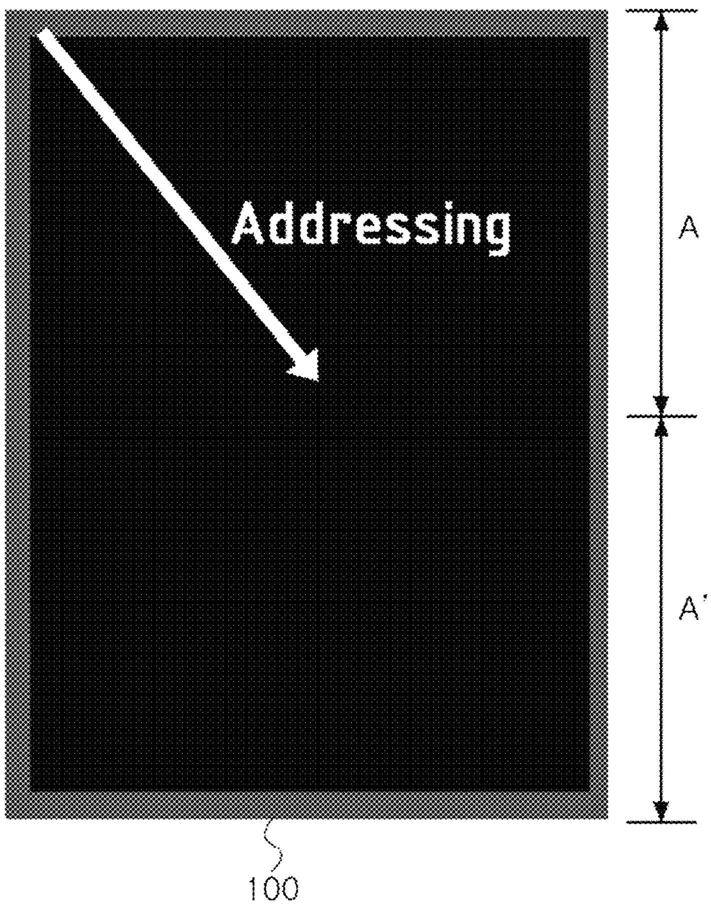
FIGS. 13A to 13E are views illustrating an example in which a data addressing, an addressing skip, and a light emission are sequentially performed along a scanning direction of a display panel according to an embodiment of the present disclosure.
Figure 13A:
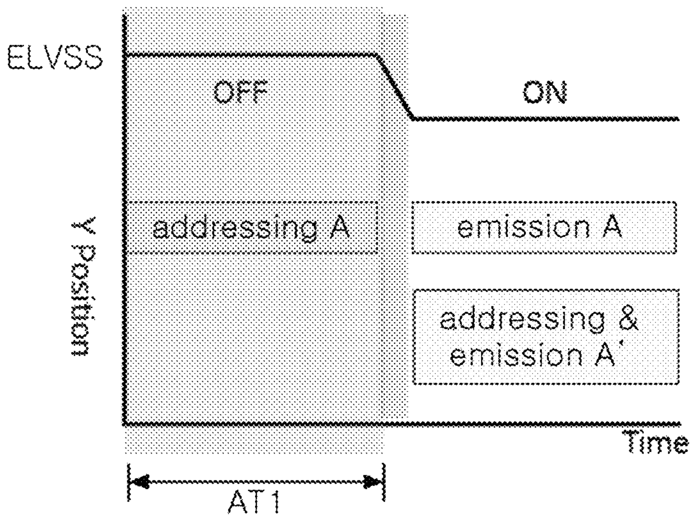

During the first addressing period AT1, as shown in FIG. 13A, data addressing is performed and pixel data is written to the pixels in the first pixel region A. During the first addressing period AT1, the pixels in the first and second pixel regions A and A' do not emit light.

Figure 13B:
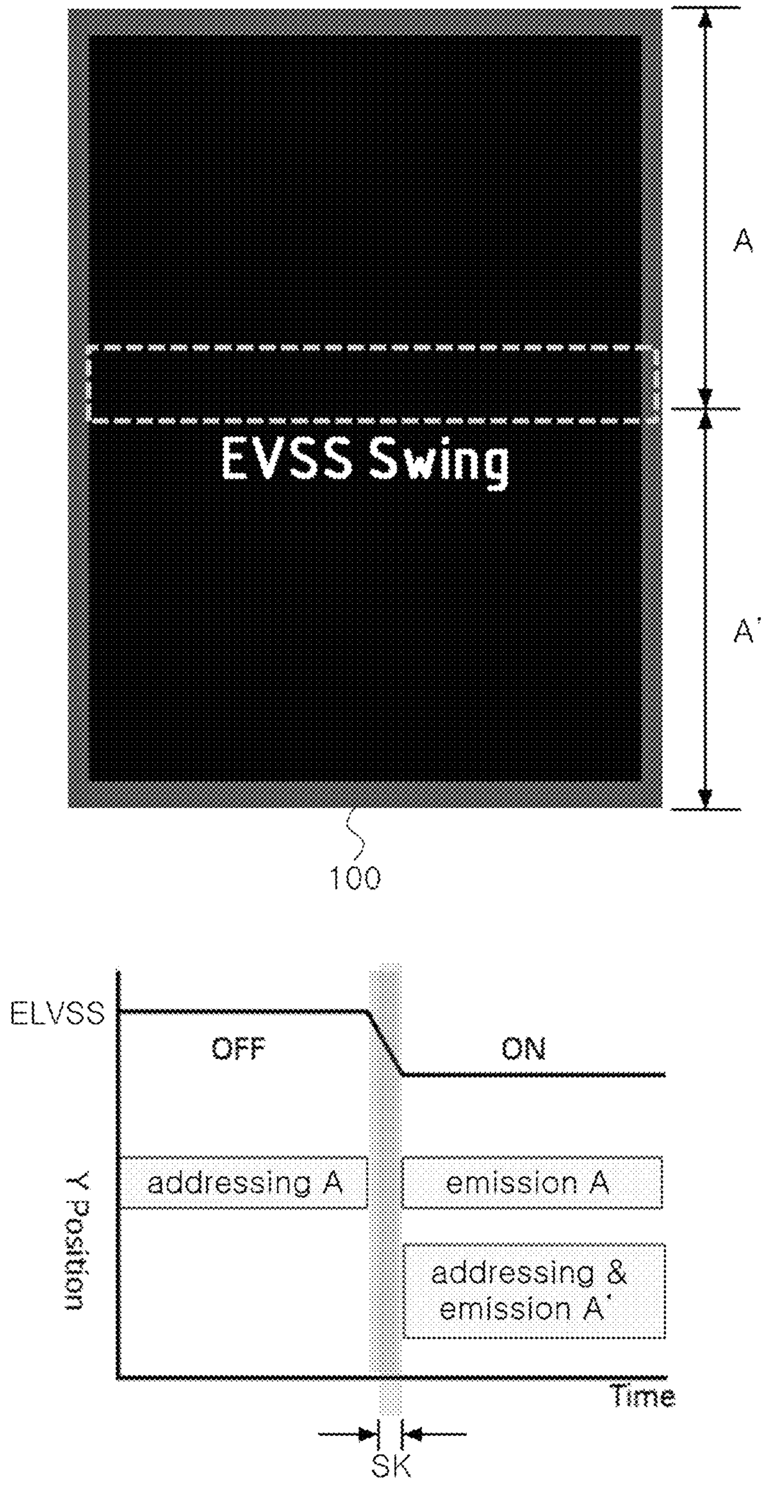

During the addressing skip session SK, as shown in FIG. 13B, the low-potential power supply voltage ELVSS is changed from the light-off voltage Voff to the light-on voltage Von. At this time, scanning is stopped with respect to the first and second pixel regions A and A', so that the pixels maintain a previous data voltage and do not emit light.

Figure 13C:
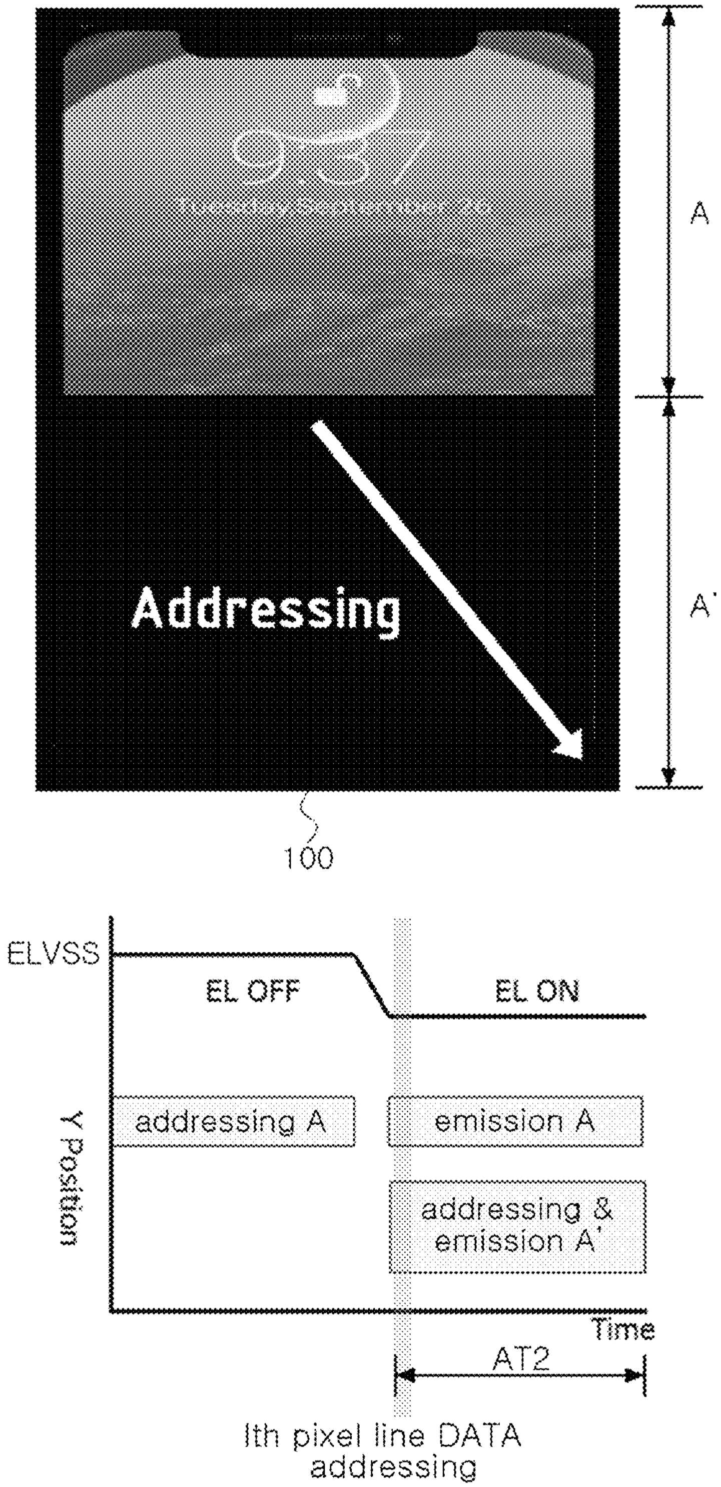

After the addressing skip session SK, the second addressing period AT2 starts. The low-potential power supply voltage ELVSS is generated at the light-on voltage Von during the second addressing period AT2. As shown in FIG. 13C, when the data voltage Vdata of the pixel data to be written in the Ith pixel line is outputted from the data driver 110 and the scan pulse SCAN synchronized with the data voltage Vdata is outputted from the gate driver 120, the second addressing period AT2 is started. After the data voltage Vdata of the pixel data is charged to the pixels in the Ith pixel line, the pixels in the first and second pixel regions A and A' start to emit light.

Figure 13D:
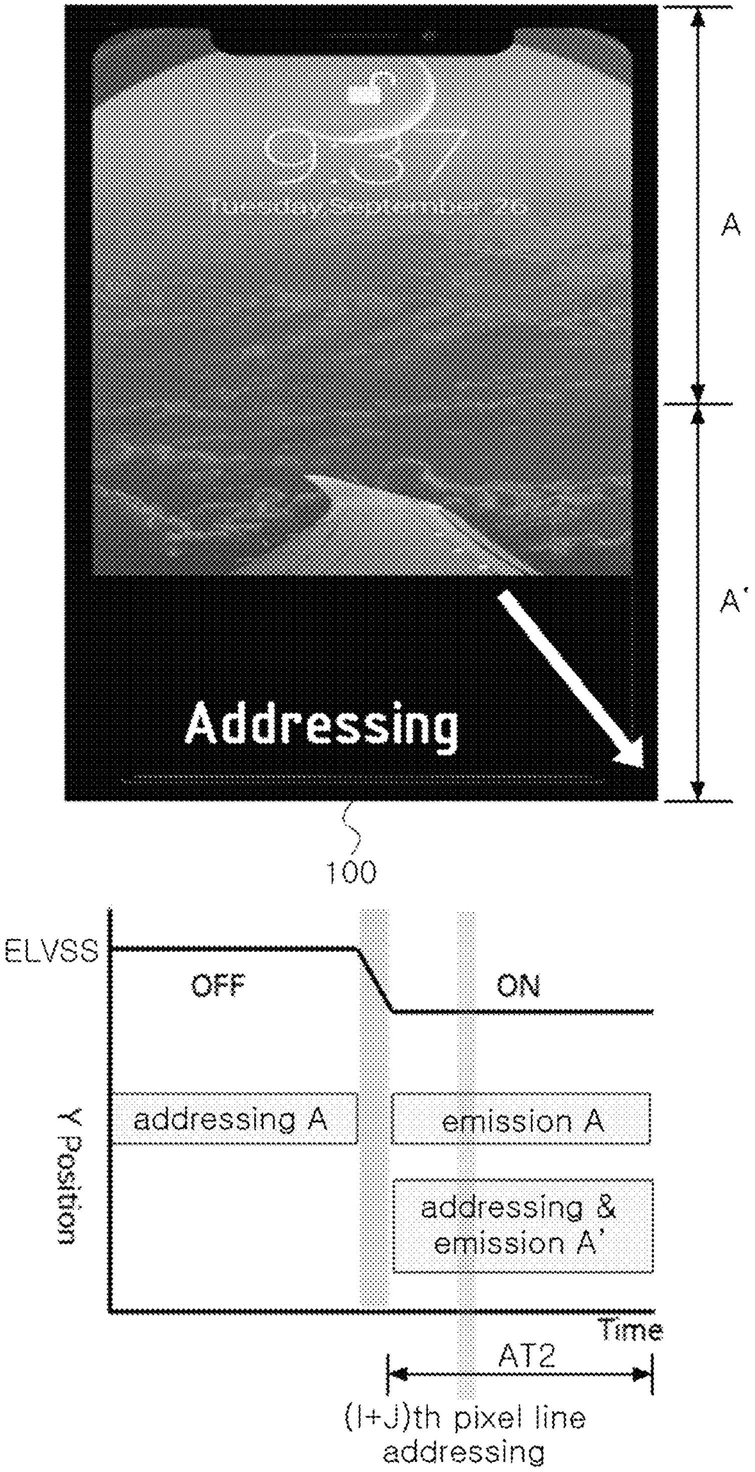

During the second addressing period AT2, as shown in FIG. 13D, data addressing is performed on the pixels in the (I+J)th pixel line. Here, each of I and J is a positive integer, and 'I+J' is a positive integer less than n. During the second addressing period AT2, the pixel lines in the first and second pixel regions A and A' may be emitted because the low-potential power supply voltage ELVSS is the light-on voltage Von.

Figure 13E:
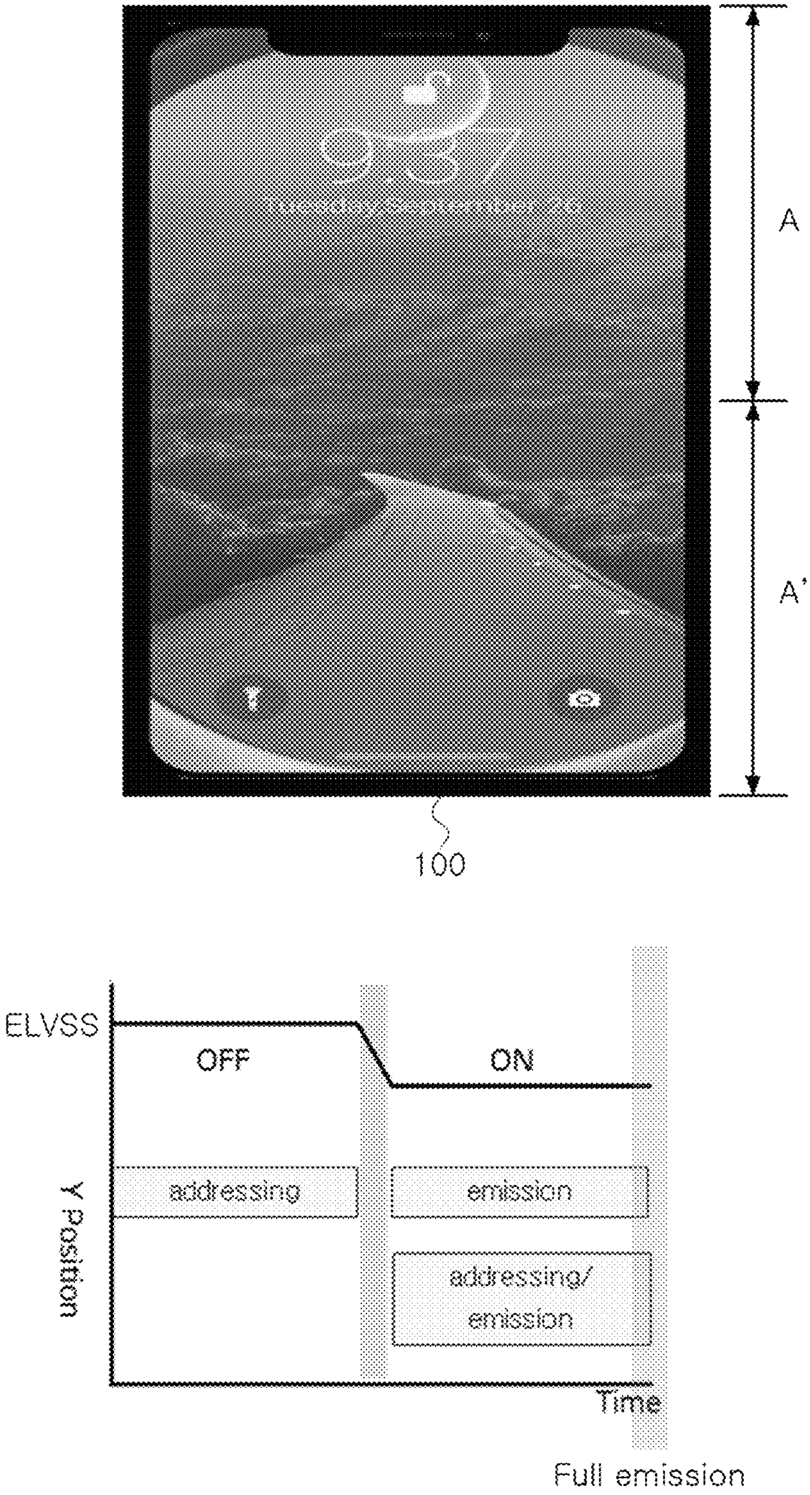

As the execution time of the second addressing period AT2 increases, the screen area that emits light is enlarged. When the data addressing is finished on the nth pixel line to which a last scan pulse is applied, all pixels of the screen are emitted (Full Emission) as illustrated in FIG. 13E.

According to the present disclosure, the luminance of pixels may be adjusted in a state in which the data voltage is fixed to a predetermined voltage or higher by adjusting the duty ratio upon performing the global dimming. The method of varying the duty ratio of lighting-on and -off the pixels may provide a stain improvement effect at low luminance.

The global dimming duty ratio can be adaptively applied according to the brightness of the surrounding environment because the luminance required on the screen is different depending on the usage environment. For example, the duty ratio of the low-potential power supply voltage ELVSS may be varied in proportion to the brightness of the surrounding environment of the display device.

Figure 14A:
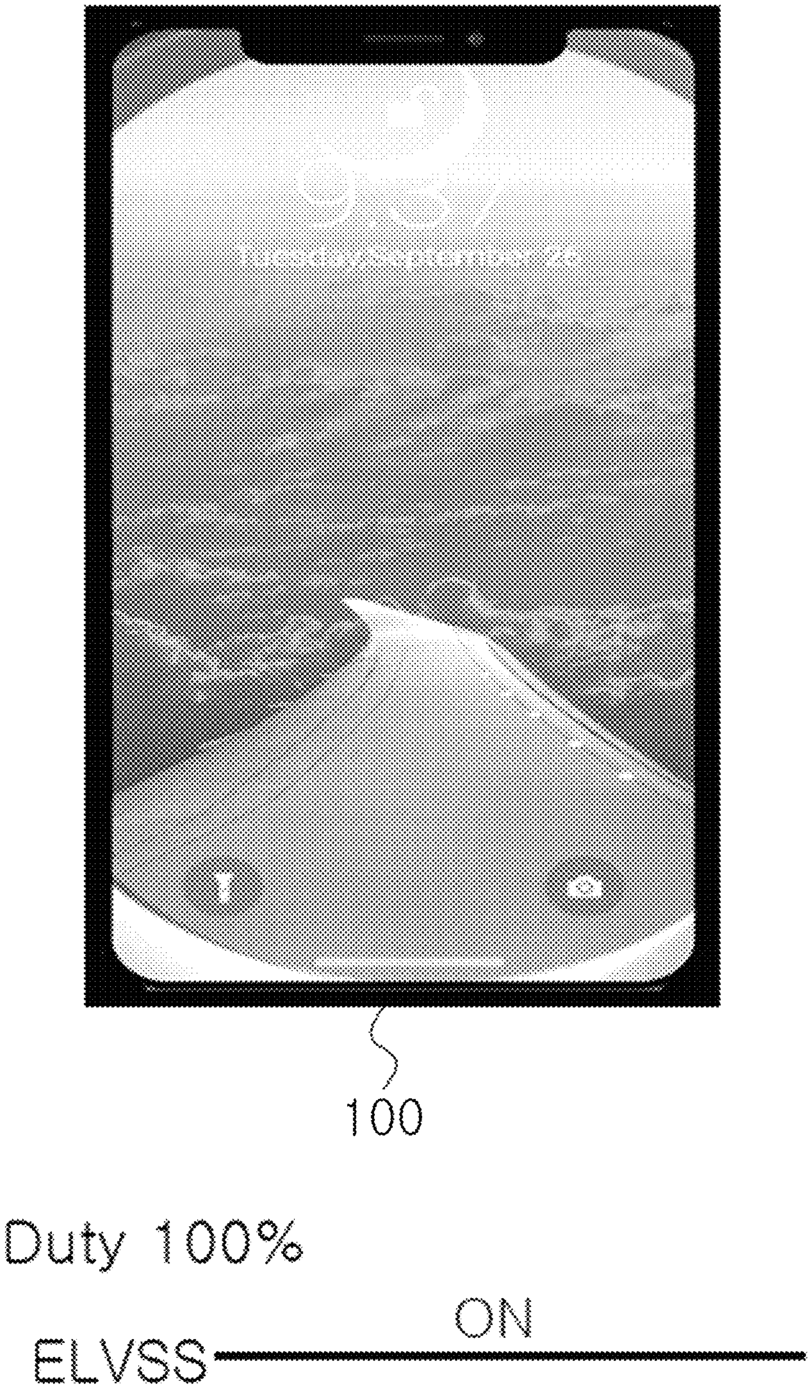
FIGS. 14A to 14C are views illustrating global dimming duty ratios applied differently according to driving modes for a display device according to an embodiment of the present disclosure.

In the case of the outdoor mode, since high luminance is required on the screen, pixels may be driven with a maximum duty ratio, that is, a duty ratio of 100%, as illustrated in FIG. 14A. The duty ratio of the low-potential power supply voltage ELVSS becomes high when the duty ratio of the low-potential power supply voltage ELVSS is changed from a normal mode, a power saving mode, or a night mode to an outdoor mode.

Figure 14B:
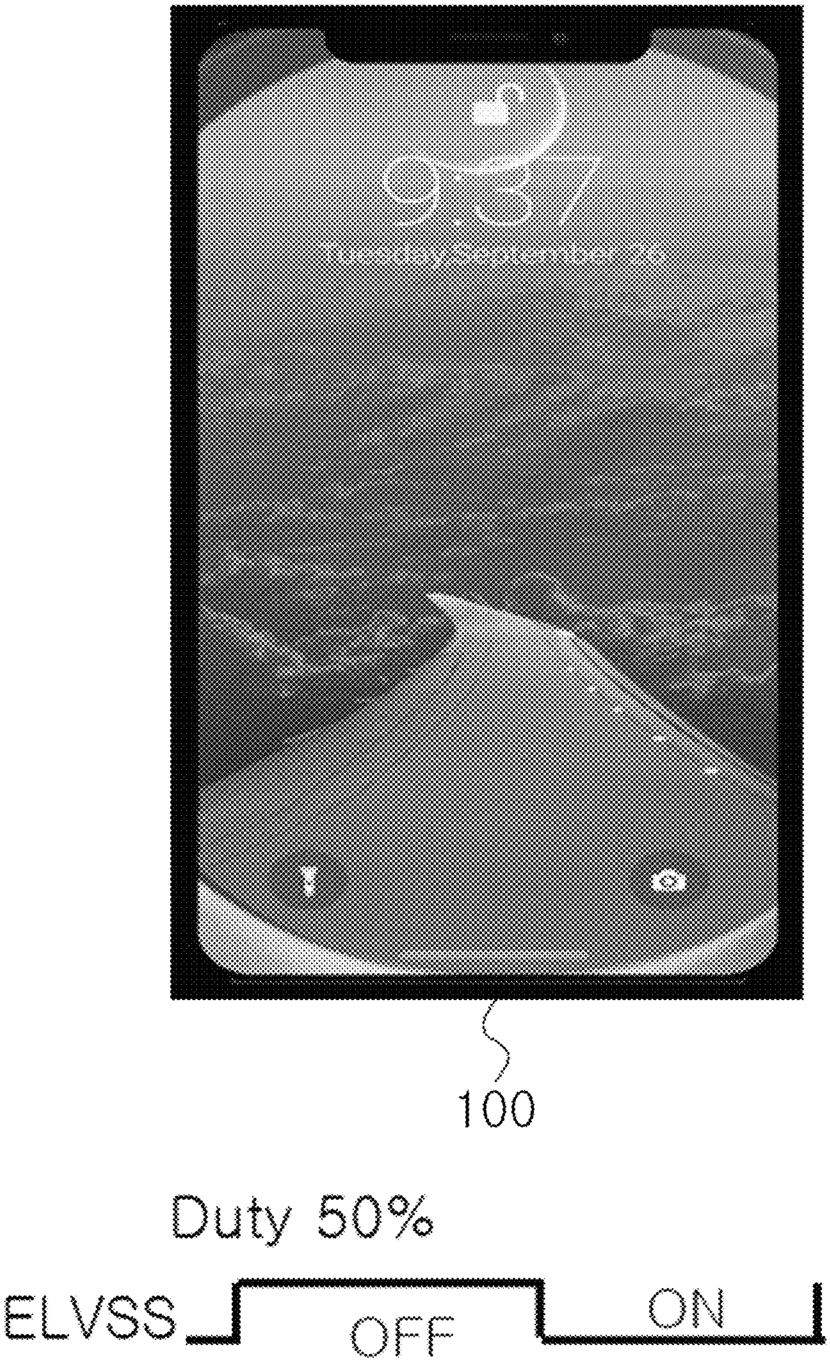

In a case of the normal mode, the global dimming duty ratio may be applied according to the brightness designated by the user, and as shown in FIG. 14B, the duty ratio of 50% as a default value may be applied.

Figure 14C:
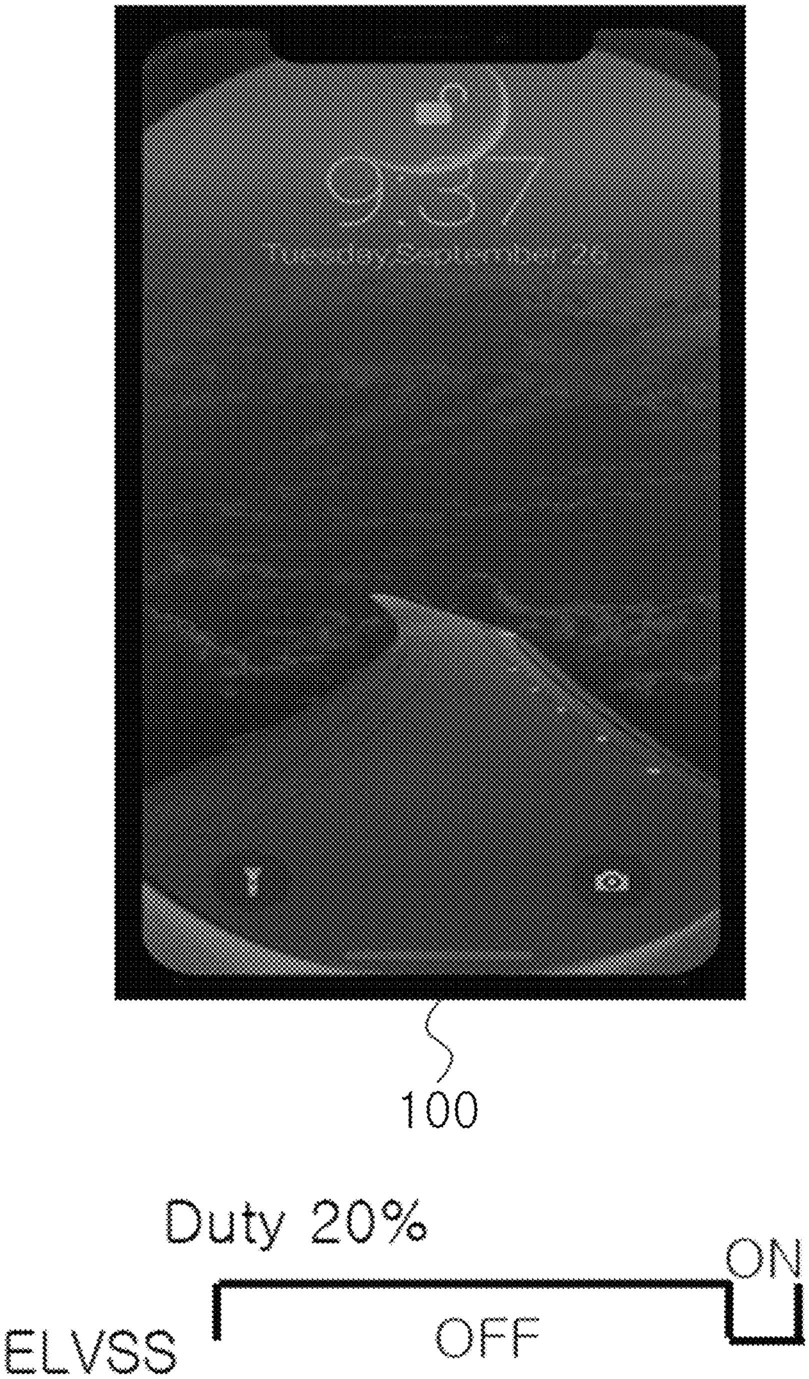

In a case of the power saving mode or the night mode, the global dimming duty ratio may be lowered to a duty ratio of 20% or less since pixels are driven at low luminance, as shown in FIG. 14C. When the driving mode is changed to the power saving mode or the night mode, the duty ratio of the low-potential power supply voltage ELVSS is lowered. The power saving mode may be entered when the remaining amount of the battery is less than a preset value. Since the night environment is more sensitive to stains on the display, the global dimming may be applied to improve the image quality improvement effect.

Figure 15:
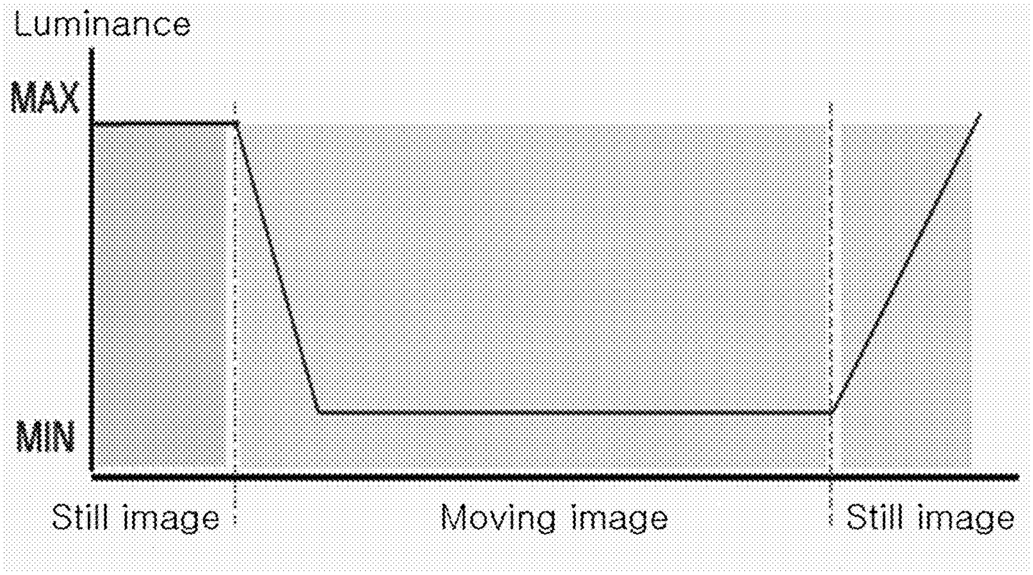
FIG. 15 is a diagram illustrating an example in which the luminance of a screen is reduced in a moving image according to an embodiment of the present disclosure.

As described above, the present disclosure may provide image quality optimized for the usage environment and reduce power consumption by adaptively varying the global dimming duty ratio according to the usage environment or the driving mode. Furthermore, according to the present disclosure, power consumption may be further reduced without deteriorating image quality based on the result of analyzing the input image. For example, as shown in FIG. 15, when an input image is a moving image, power consumption in the moving image may be reduced by lowering the luminance of the moving image compared to a still image. Compared to the still images, the moving image has more complexity, such as many edges and a lot of movement of objects, so a user does not react sensitively to the increase or decrease in luminance Therefore, even if the luminance of the screen decreases in the moving image, the image quality that the user may recognize is low.

Figure 16:
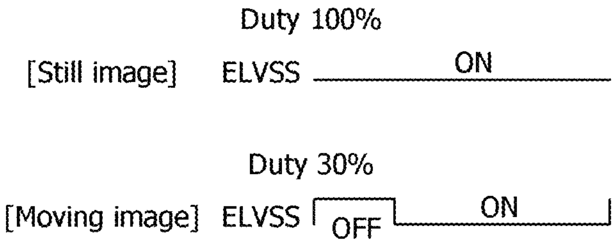
FIG. 16 is a diagram comparing global dimming duty ratios in a still image and a moving image according to an embodiment of the present disclosure.

The timing controller 130 may analyze the input image and vary the duty ratio of the low-potential power supply voltage ELVSS, as shown in FIG. 16, to lower the global dimming duty ratio of the moving image than that of the still image, thereby decreasing the luminance of the screen on which the moving image is reproduced and reducing power consumption. FIG. 16 illustrates an example in which the global dimming duty ratio for the still image is 100% and the global dimming duty ratio for the video is lowered to 30%. The global dimming duty ratio is substantially the same as the duty ratio of the low-potential power supply voltage ELVSS. The timing controller 130 may lower the global dimming duty ratio when the input image is changed from the still image to the moving image, and may increase the global dimming duty ratio when the input image is changed from the moving image to the still image. The timing controller may enter the low-speed driving mode for the still image and lower the frame frequency, thereby reducing power consumption even in the still image.

Figure 17:
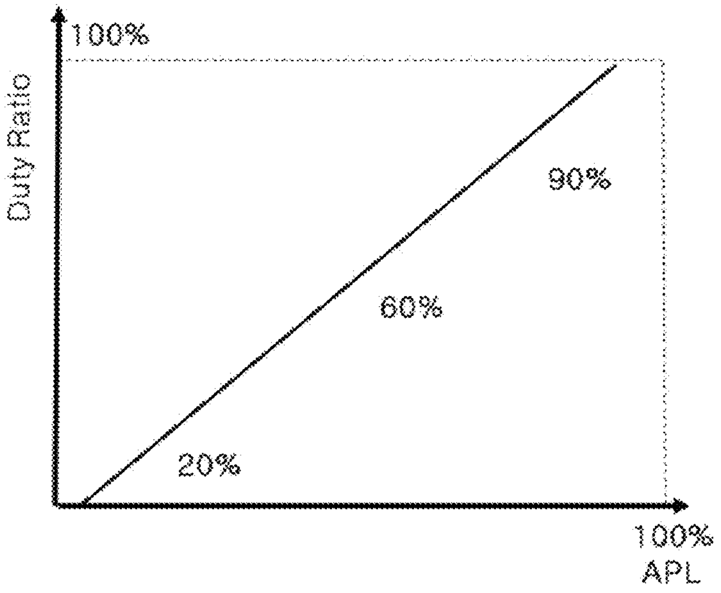
FIGS. 17 and 18 are diagrams illustrating an example in which a global dimming duty ratio is varied based on an average picture level (APL) according to an embodiment of the present disclosure.
Figure 18:
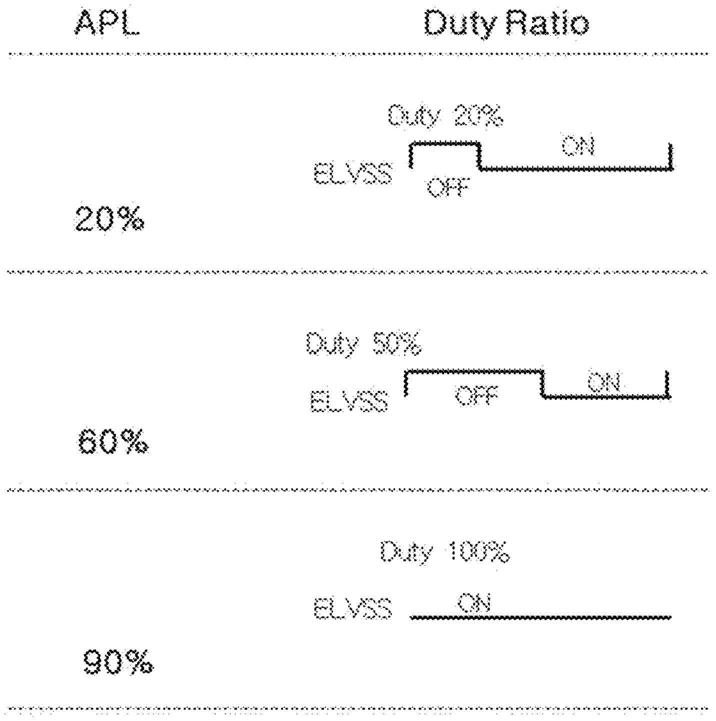

The duty ratio of the low-potential power supply voltage ELVSS may be varied in proportion to an average brightness of one first frame image as shown in FIGS. 17 and 18.

FIGS. 17 and 18 are diagrams illustrating an example in which a global dimming duty ratio is varied based on an average picture level (APL).

Referring to FIGS. 17 and 18, the average picture level APL is a value representing an average brightness of one frame image and is calculated as an average value of accumulated distribution values for each gray scale level of the one frame image. An image with a higher average image level (APL) is a brighter image, and an image with a lower average image level (APL) is a darker image. The timing controller 130 may vary the global dimming duty ratio in proportion to the average picture level (APL) of the one frame image calculated for every frame. The timing controller 130 increases the global dimming duty ratio to increase the luminance of the screen by increasing the duty ratio of the low-potential power supply voltage ELVSS in a bright image having a high average picture level (APL). The timing controller 130 may lower the global dimming duty ratio to lower the luminance of the screen by lowering the duty ratio of the low-potential power supply voltage ELVSS in a dark image having a low average picture level (APL). In addition, the timing controller may increase the voltage range between the maximum voltage and the minimum voltage of the data voltage Vdata in dark images with a low average picture level (APL), (e.g., extend the data voltage range) to improve low-gray scale representation in the dark images.

In one embodiment, a display device comprises: a display panel including a first display area comprising a first plurality of pixels, and a second display area comprising a second plurality of pixels, each pixel from the first plurality of pixels and the second plurality of pixels including a corresponding light emitting element; a data driver circuit configured to output a plurality of data voltages of an image to the first plurality of pixels and the second plurality of pixels; a gate driver configured to output a plurality of scan signals to the first plurality of pixels and the second plurality of pixels; and a power supply configured to generate a low-potential power supply voltage that is applied to a corresponding light emitting element included in each pixel from the first plurality of pixels and the second plurality of pixels, the low-potential power supply voltage switching between a first level such that the light emitting element in each respective pixel is capable of emitting light, and a second level such that the light emitting element in each respective pixel cannot emit light, wherein a frame period of the display device includes an addressing period during which the plurality of data voltages of the image and the plurality of scan signals are output to the first plurality of pixels and the second plurality of pixels, and a blank period during which the plurality of data voltages and the plurality of scan signals are not output to the first plurality of pixels and the second plurality of pixels, wherein during a first portion of the addressing period the low-potential power supply voltage is at the second level such that none of the first plurality of pixels in the first display area emit light and none of the second plurality of pixels in the second display area emit light, and during a second portion of the addressing period that is subsequent the first portion, the low-potential power supply voltage is at the first level such that the first plurality of pixels in the first display area emit light to display a first part of the image and at least a portion of the second plurality of pixels in the second display area emit light to display at least a portion of a second part of the image.

In one embodiment, each of the first plurality of pixels the second plurality of pixels respectively comprises: a driving element including a first electrode of the driving element that is connected to a first node to which a first power line applies a pixel driving voltage to the first node, a gate electrode of the driving element that is connected to a second node, and a second electrode of the driving element that is connected to a third node; a light emitting element including an anode connected to the third node and a cathode to which the low-potential power supply voltage is applied; a capacitor between the second node and the third node; and a first switch element including a first electrode of the first switch element that is connected to a data line to which a data voltage from the plurality of data voltages is applied, a gate electrode of the first switch element to which a scan signal from the plurality of scan signals is applied, and a second electrode of the second switch element that is connected to the second node.

In one embodiment, during the first portion of the addressing period, first data voltages from the plurality of data voltages are written to the first plurality of pixels in the first display area via first switch elements included in the first plurality of pixels without writing second data voltages from the plurality of data voltages to the second plurality of pixels in the second display area while the low-potential power supply voltage is at the second level, and during the second portion of the addressing period, light emitting elements included in the first plurality of pixels in the first display area emit light corresponding to the first data voltages to display the first part of the image, and at least a portion of the second data voltages from the plurality of data voltages are written to a portion of the second plurality of pixels in the second display area via first switch elements included in the second plurality of pixels, and light emitting elements included in the portion of the second plurality of pixels emit light corresponding to the portion of the second data voltages to display the portion of the second part of the image while the low-potential power supply voltage is at the first level, wherein the first plurality of pixels are arranged in a first plurality of pixel lines in the first display area, and the second plurality of pixels are arranged in a second plurality of pixel lines in the second display area, wherein during the second portion of the addressing period, the first plurality of pixel lines substantially simultaneously display the first part of the image, and the second plurality of pixel lines sequentially display a corresponding portion of the second part of the image in the second display area as each second pixel line is written with corresponding second data voltages.

In one embodiment, the addressing period further includes an intermediate period between the first portion of the addressing period and the second portion of the addressing period, and the low-potential power supply voltage switches from the second level to the first level during the intermediate period.

In one embodiment, the gate driver refrains from outputting the plurality of scan signals during the intermediate period.

In one embodiment, a duty ratio of the low-potential power supply voltage at the first level and the low-potential power supply voltage at the second level during the addressing period is adjustable between one of a plurality of duty ratios, wherein a luminance of the image displayed by the display device is based on a selected duty ratio from the plurality of duty ratios.

In one embodiment, the luminance of the image is increased as the duty ratio increases and the luminance of the image is decreased as the duty ratio decreases.

In one embodiment, a duty ratio from the plurality of duty ratios is selected based on whether the image is a still image or a moving image.

In one embodiment, a first duty ratio from the plurality of duty ratios for the still image is associated with a greater luminance than a second duty ratio from the plurality of duty ratios for the moving image.

In one embodiment, each of the plurality of duty ratios is associated with a corresponding average brightness and a duty ratio for the frame period is selected from the plurality of duty ratios based an average brightness of the image to be displayed during the frame period.

In one embodiment, a size of the first display area and a size of the second display area is based on the duty ratio selected from the plurality of duty ratios.

In one embodiment, the size of the first display area decreases and the size of the second area increases as the duty ratio increases, and the size of the first display area increases and the size of the second area decrease as the duty ratio decreases.

In one embodiment, a display device comprises: a display panel including a first display area comprising a first plurality of pixels, and a second display area comprising a second plurality of pixels, each pixel from the first plurality of pixels and the second plurality of pixels including a corresponding light emitting element; a data driver circuit configured to output a plurality of data voltages of an image to the first plurality of pixels and the second plurality of pixels; a gate driver configured to output a plurality of scan signals to the first plurality of pixels and the second plurality of pixels; and a power supply configured to generate a low-potential power supply voltage that is applied to a corresponding light emitting element included in each pixel from the first plurality of pixels and the second plurality of pixels, the low-potential power supply voltage switching between a first level such that the light emitting element in each respective pixel is capable of emitting light, and a second level that is greater than the first level such that the light emitting element in each respective pixel cannot emit light, wherein a frame period of the display device includes an addressing period during which the plurality of data voltages of the image and the plurality of scan signals are output to the first plurality of pixels and the second plurality of pixels, and during the addressing period the low-potential power supply voltage switches from the second level to the first level such that the light emitting element in each respective pixel can emit light to display the image.

In one embodiment, the low-potential power supply voltage is applied a cathode of each of corresponding light emitting element.

In one embodiment, a duty ratio of the low-potential power supply voltage at the first level and the low-potential power supply voltage at the second level during the addressing period is adjustable between one of a plurality of duty ratios.

In one embodiment, during a first portion of the addressing period the low-potential power supply voltage is at the second level such that none of the first plurality of pixels in the first display area emit light and none of the second plurality of pixels in the second display area emit light, and during a second portion of the addressing period that is subsequent the first portion, the low-potential power supply voltage is at the first level such that the first plurality of pixels in the first display area emit light to display a first part of the image in the first display area and at least a portion of the second plurality of pixels in the second display area emit light to display at least a portion of a second part of the image in the second display area.

In one embodiment, a display device comprises: a display panel including a first display area comprising a first plurality of pixels, and a second display area comprising a second plurality of pixels, each pixel from the first plurality of pixels and the second plurality of pixels including a corresponding light emitting element; a data driver circuit configured to output a plurality of data voltages of an image to the first plurality of pixels and the second plurality of pixels; a gate driver configured to output a plurality of scan signals to the first plurality of pixels and the second plurality of pixels; and a power supply configured to generate a low-potential power supply voltage that is applied to a corresponding light emitting element included in each pixel from the first plurality of pixels and the second plurality of pixels, the low-potential power supply voltage switching between a first level such that the light emitting element in each respective pixel is capable of emitting light, and a second level that is greater than the first level such that the light emitting element in each respective pixel cannot emit light, wherein a frame period of the display device includes an addressing period during which the plurality of data voltages of the image and the plurality of scan signals are output to the first plurality of pixels and the second plurality of pixels, and during the addressing period the low-potential power supply voltage switches from the second level to the first level, wherein the display device is configured to operate in one of a plurality of modes where each mode has a corresponding a duty ratio of the first level of the low-potential power supply voltage and the second level of the low-potential power supply voltage from a plurality of different duty ratios, wherein the display device is configured to operate in one of a plurality of modes where each mode has a corresponding a duty ratio of the first level of the low-potential power supply voltage and the second level of the low-potential power supply voltage from a plurality of different duty ratios.

In one embodiment, the plurality of modes include an outdoor mode having a first duty ratio of the low-potential power supply voltage, a normal mode having a second duty ratio of the low-potential power supply voltage that is less than the first duty ratio of the outdoor mode, and a power saving mode having a third duty ratio of the low-potential power supply voltage that is less than the second duty ratio.

In one embodiment, the plurality of modes include a still image mode during which the image displayed in the frame period is a still image and a moving image mode during which the image displayed during the frame period is a moving image, wherein a duty ratio of the still image mode is greater than a duty ratio of the moving image mode.

In one embodiment, during a first portion of the addressing period the low-potential power supply voltage is at the second level such that none of the first plurality of pixels in the first display area emit light and none of the second plurality of pixels in the second display area emit light, and during a second portion of the addressing period that is subsequent the first portion, the low-potential power supply voltage is at the first level such that the first plurality of pixels in the first display area emit light to display a first part of the image in the first display area and at least a portion of the second plurality of pixels in the second display area emit light to display at least a portion of a second part of the image in the second display area.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:

a display panel including a first display area comprising a first plurality of pixels, and a second display area comprising a second plurality of pixels, each pixel from the first plurality of pixels and the second plurality of pixels including a corresponding light emitting element;

a data driver circuit configured to output a plurality of data voltages of an image to the first plurality of pixels and the second plurality of pixels;

a gate driver configured to output a plurality of scan signals to the first plurality of pixels and the second plurality of pixels; and a power supply configured to generate a low-potential power supply voltage that is applied to a corresponding light emitting element included in each pixel from the first plurality of pixels and the second plurality of pixels, the low-potential power supply voltage switching between a first level such that the light emitting element in each respective pixel is capable of emitting light, and a second level such that the light emitting element in each respective pixel cannot emit light, wherein a frame period of the display device includes an addressing period during which the plurality of data voltages of the image and the plurality of scan signals are output to the first plurality of pixels and the second plurality of pixels, and a blank period during which the plurality of data voltages and the plurality of scan signals are not output to the first plurality of pixels and the second plurality of pixels, wherein during a first portion of the addressing period the low-potential power supply voltage is at the second level such that none of the first plurality of pixels in the first display area emit light and none of the second plurality of pixels in the second display area emit light, and during a second portion of the addressing period that is subsequent the first portion, the low-potential power supply voltage is at the first level such that the first plurality of pixels in the first display area emit light to display a first part of the image and at least a portion of the second plurality of pixels in the second display area emit light to display at least a portion of a second part of the image, wherein a duty ratio of the low-potential power supply voltage at the first level and the low-potential power supply voltage at the second level during the addressing period is adjustable between one of a plurality of duty ratios, wherein a luminance of the image displayed by the display device is based on a selected duty ratio from the plurality of duty ratios.

2. The display device of claim 1, wherein each of the first plurality of pixels the second plurality of pixels respectively comprises:

a driving element including a first electrode of the driving element that is connected to a first node to which a first power line applies a pixel driving voltage to the first node, a gate electrode of the driving element that is connected to a second node, and a second electrode of the driving element that is connected to a third node;

a light emitting element including an anode connected to the third node and a cathode to which the low-potential power supply voltage is applied;

a capacitor between the second node and the third node; and a first switch element including a first electrode of the first switch element that is connected to a data line to which a data voltage from the plurality of data voltages is applied, a gate electrode of the first switch element to which a scan signal from the plurality of scan signals is applied, and a second electrode of the second switch element that is connected to the second node.

3. The display device of claim 2, wherein during the first portion of the addressing period, first data voltages from the plurality of data voltages are written to the first plurality of pixels in the first display area via first switch elements included in the first plurality of pixels without writing second data voltages from the plurality of data voltages to the second plurality of pixels in the second display area while the low-potential power supply voltage is at the second level, and during the second portion of the addressing period, light emitting elements included in the first plurality of pixels in the first display area emit light corresponding to the first data voltages to display the first part of the image, and at least a portion of the second data voltages from the plurality of data voltages are written to a portion of the second plurality of pixels in the second display area via first switch elements included in the second plurality of pixels, and light emitting elements included in the portion of the second plurality of pixels emit light corresponding to the portion of the second data voltages to display the portion of the second part of the image while the low-potential power supply voltage is at the first level, wherein the first plurality of pixels are arranged in a first plurality of pixel lines in the first display area, and the second plurality of pixels are arranged in a second plurality of pixel lines in the second display area, wherein during the second portion of the addressing period, the first plurality of pixel lines substantially simultaneously display the first part of the image, and the second plurality of pixel lines sequentially display a corresponding portion of the second part of the image in the second display area as each second pixel line is written with corresponding second data voltages.

4. The display device of claim 1, wherein the addressing period further includes an intermediate period between the first portion of the addressing period and the second portion of the addressing period, and the low-potential power supply voltage switches from the second level to the first level during the intermediate period.

5. The display device of claim 4, wherein the gate driver refrains from outputting the plurality of scan signals during the intermediate period.

6. The display device of claim 1, wherein the luminance of the image is increased as the duty ratio increases and the luminance of the image is decreased as the duty ratio decreases.

7. The display device of claim 6, wherein a duty ratio from the plurality of duty ratios is selected based on whether the image is a still image or a moving image.

8. The display device of claim 7, wherein a first duty ratio from the plurality of duty ratios for the still image is associated with a greater luminance than a second duty ratio from the plurality of duty ratios for the moving image.

9. The display device of claim 1, wherein each of the plurality of duty ratios is associated with a corresponding average brightness and a duty ratio for the frame period is selected from the plurality of duty ratios based an average brightness of the image to be displayed during the frame period.

10. The display device of claim 1, wherein a size of the first display area and a size of the second display area is based on the duty ratio selected from the plurality of duty ratios.

11. The display device of claim 10, wherein the size of the first display area decreases and the size of the second area increases as the duty ratio increases, and the size of the first display area increases and the size of the second area decrease as the duty ratio decreases.

12. A display device comprising:

a display panel including a first display area comprising a first plurality of pixels, and a second display area comprising a second plurality of pixels, each pixel from the first plurality of pixels and the second plurality of pixels including a corresponding light emitting element;

a data driver circuit configured to output a plurality of data voltages of an image to the first plurality of pixels and the second plurality of pixels;

a gate driver configured to output a plurality of scan signals to the first plurality of pixels and the second plurality of pixels; and a power supply configured to generate a low-potential power supply voltage that is applied to a corresponding light emitting element included in each pixel from the first plurality of pixels and the second plurality of pixels, the low-potential power supply voltage switching between a first level such that the light emitting element in each respective pixel is capable of emitting light, and a second level that is greater than the first level such that the light emitting element in each respective pixel cannot emit light, wherein a frame period of the display device includes an addressing period during which the plurality of data voltages of the image and the plurality of scan signals are output to the first plurality of pixels and the second plurality of pixels, and a blank period during which the plurality of data voltages and the plurality of scan signals are not output to the first plurality of pixels and the second plurality of pixels, and during the addressing period the low-potential power supply voltage switches from the second level to the first level such that the light emitting element in each respective pixel can emit light to display the image, wherein a duty ratio of the low-potential power supply voltage at the first level and the low-potential power supply voltage at the second level during the addressing period is adjustable between one of a plurality of duty ratios, wherein during a first portion of the addressing period the low-potential power supply voltage is at the second level such that none of the first plurality of pixels in the first display area emit light and none of the second plurality of pixels in the second display area emit light, and during a second portion of the addressing period that is subsequent the first portion, the low-potential power supply voltage is at the first level such that the first plurality of pixels in the first display area emit light to display a first part of the image in the first display area and at least a portion of the second plurality of pixels in the second display area emit light to display at least a portion of a second part of the image in the second display area.

13. The display device according to claim 12, wherein the low-potential power supply voltage is applied a cathode of each of corresponding light emitting element.

14. A display device comprising:

a display panel including a first display area comprising a first plurality of pixels, and a second display area comprising a second plurality of pixels, each pixel from the first plurality of pixels and the second plurality of pixels including a corresponding light emitting element;

a data driver circuit configured to output a plurality of data voltages of an image to the first plurality of pixels and the second plurality of pixels;

a gate driver configured to output a plurality of scan signals to the first plurality of pixels and the second plurality of pixels; and a power supply configured to generate a low-potential power supply voltage that is applied to a corresponding light emitting element included in each pixel from the first plurality of pixels and the second plurality of pixels, the low-potential power supply voltage switching between a first level such that the light emitting element in each respective pixel is capable of emitting light, and a second level that is greater than the first level such that the light emitting element in each respective pixel cannot emit light, wherein a frame period of the display device includes an addressing period during which the plurality of data voltages of the image and the plurality of scan signals are output to the first plurality of pixels and the second plurality of pixels, and a blank period during which the plurality of data voltages and the plurality of scan signals are not output to the first plurality of pixels and the second plurality of pixels, and during the addressing period the low-potential power supply voltage switches from the second level to the first level, wherein the display device is configured to operate in one of a plurality of modes where each mode has a corresponding a duty ratio of the first level of the low-potential power supply voltage and the second level of the low-potential power supply voltage from a plurality of different duty ratios, wherein during a first portion of the addressing period the low-potential power supply voltage is at the second level such that none of the first plurality of pixels in the first display area emit light and none of the second plurality of pixels in the second display area emit light, and during a second portion of the addressing period that is subsequent the first portion, the low-potential power supply voltage is at the first level such that the first plurality of pixels in the first display area emit light to display a first part of the image in the first display area and at least a portion of the second plurality of pixels in the second display area emit light to display at least a portion of a second part of the image in the second display area.

15. The display device of claim 14, wherein the plurality of modes include an outdoor mode having a first duty ratio of the low-potential power supply voltage, a normal mode having a second duty ratio of the low-potential power supply voltage that is less than the first duty ratio of the outdoor mode, and a power saving mode having a third duty ratio of the low-potential power supply voltage that is less than the second duty ratio.

16. The display device of claim 14, wherein the plurality of modes include a still image mode during which the image displayed in the frame period is a still image and a moving image mode during which the image displayed during the frame period is a moving image, wherein a duty ratio of the still image mode is greater than a duty ratio of the moving image mode.

* * * * *